(12) United States Patent
Takeuchi

(10) Patent No.: US 7,768,157 B2
(45) Date of Patent: Aug. 3, 2010

(54) BRUSHLESS MOTOR

(75) Inventor: Kesatoshi Takeuchi, Shiojiri (JP)

(73) Assignee: Seiko Epson Corporation (JP)

( * ) Notice: Subject to any disclaimer, the term of this patent is extended or adjusted under 35 U.S.C. 154(b) by 254 days.

(21) Appl. No.: 11/975,149

(22) Filed: Oct. 17, 2007

(65) Prior Publication Data

US 2008/0100151 A1 May 1, 2008

(30) Foreign Application Priority Data

Oct. 30, 2006 (JP) ............................ 2006-294079
May 14, 2007 (JP) ............................ 2007-128212
Aug. 14, 2007 (JP) ............................ 2007-211217

(51) Int. Cl.
*H02K 41/00* (2006.01)
(52) U.S. Cl. .................. 310/12.21; 310/12.24; 310/181
(58) Field of Classification Search ............. 310/12.24, 310/266, 112–114, 179, 12.21, 12.22, 12.25, 310/156.43, 268, 181
See application file for complete search history.

(56) References Cited

U.S. PATENT DOCUMENTS

| | | | | |
|---|---|---|---|---|
| 4,564,778 A | * | 1/1986 | Yoshida | ...................... 310/177 |
| 5,334,899 A | * | 8/1994 | Skybyk | ...................... 310/268 |
| 6,011,337 A | * | 1/2000 | Lin et al. | ............... 310/156.37 |
| 6,198,196 B1 | * | 3/2001 | De Simon et al. | ........... 310/268 |
| 6,278,216 B1 | * | 8/2001 | Li | .............................. 310/424 |
| 6,870,284 B2 | * | 3/2005 | Uchida | .................... 310/12.24 |
| 7,291,958 B2 | * | 11/2007 | Dombrovski | ............ 310/261.1 |

FOREIGN PATENT DOCUMENTS

| | | |
|---|---|---|
| JP | 56-120785 | 9/1981 |
| JP | 2001-298982 | 10/2001 |

* cited by examiner

*Primary Examiner*—Dang D Le
(74) *Attorney, Agent, or Firm*—Harness, Dickey & Pierce, P.L.C.

(57) ABSTRACT

The brushless motor includes a first permanent magnet magnetized in a direction perpendicular to the drive direction, and a electromagnetic coil wound around an axis parallel to the drive direction. The drive control circuit supplies a drive current in a given first electric current direction to the electromagnetic coil without changing the electric current direction to operate the brushless motor in the drive direction.

3 Claims, 41 Drawing Sheets

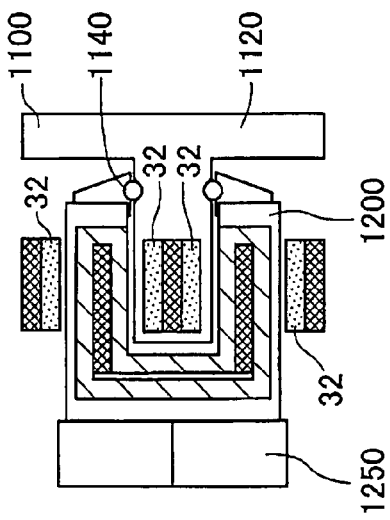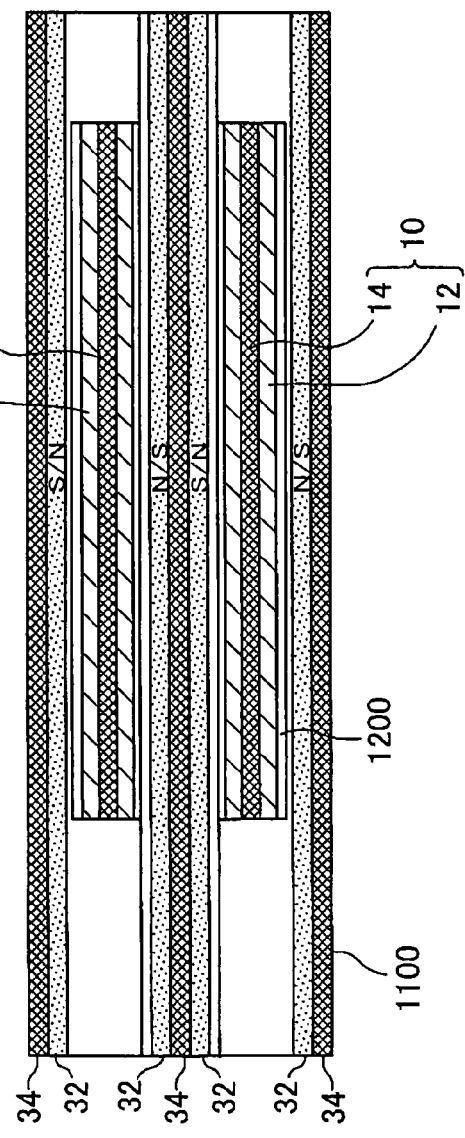
Fig.14A
Fig.14B

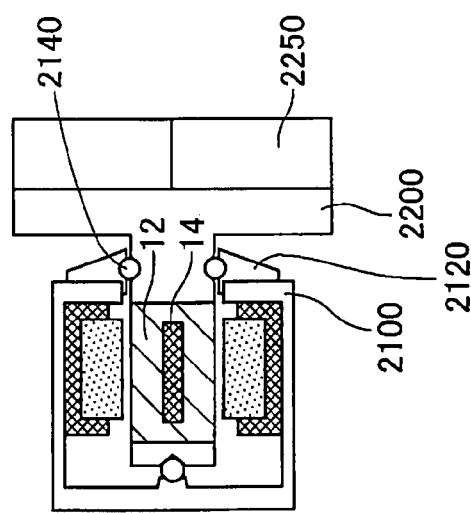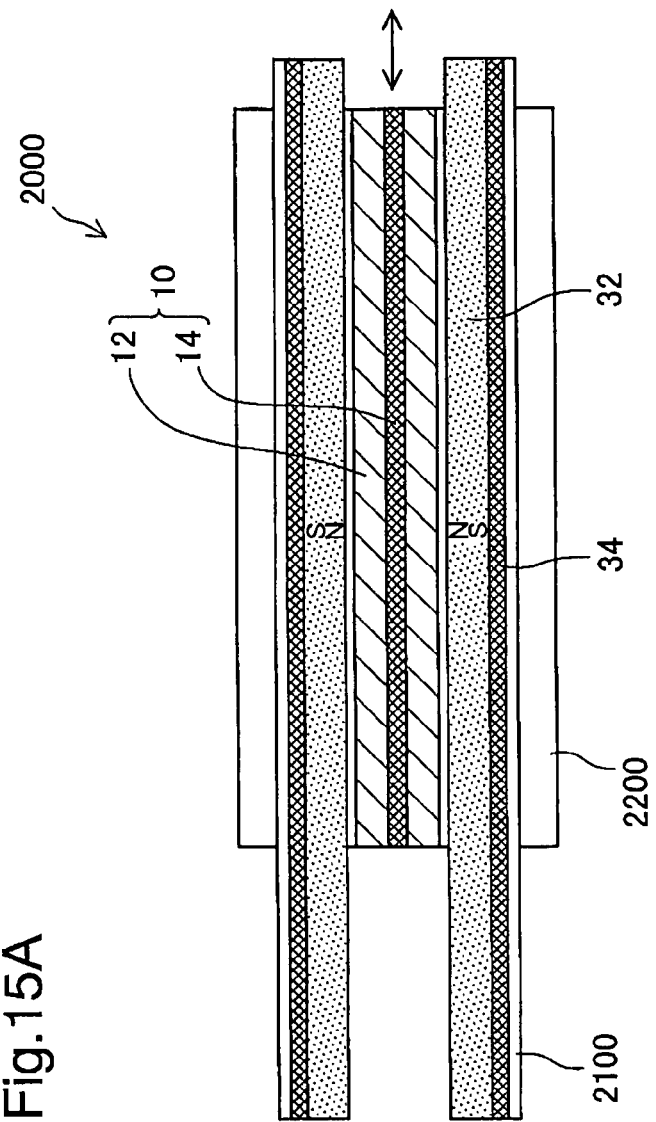

BRUSHLESS MOTOR

CROSS-REFERENCE TO RELATED APPLICATIONS

The present application claims the priority based on Japanese Patent Applications No. 2006-294079 filed on Oct. 30, 2006, No. 2007-128212 filed on May 14, 2007, and No. 2007-211217 filed on Aug. 14, 2007, the disclosures of which are hereby incorporated by reference in its entirety.

BACKGROUND OF THE INVENTION

1. Field of the Invention

The present invention is related to a brushless motor that employs permanent magnets and electromagnetic coils.

2. Description of the Related Art

Brushless motors are described, for example, in JPA2001-298982.

Conventional brushless motors are operated in the desired drive direction by properly switching the direction of the current applied to the electromagnetic coils. However, the configuration of the drive control circuit used to switch the direction of the current is complex and there are problems of loss occurring along with the switching operation.

SUMMARY OF THE INVENTION

An object of the present invention is to provide a brushless motor in which the drive control circuit's configuration is simpler and more efficient.

According to one aspect of the present invention, there is provided a brushless motor operable in a given drive direction. The brushless motor comprises a first member including a first permanent magnet magnetized in a direction perpendicular to the drive direction; a second member opposing the first drive member and including a electromagnetic coil wound around an axis parallel to the drive direction; and a drive control circuit configured to supply electric power to the electromagnetic coil. The drive control circuit supplies a drive current in a given first electric current direction to the electromagnetic coil without changing the electric current direction to operate the brushless motor in the drive direction.

With this brushless motor, because a difference in the driving force is generated between the coil portion on the side close to the permanent magnet and the coil portion on the side far away from the permanent magnet, a net driving force that is equal to this difference is generated. Thus, it is possible to operate the brushless motor in a given drive direction by supplying a drive current to the electromagnetic coil in the first current direction.

The electromagnetic coil may be wound around a magnetic flux shielding member serving an axis of winding which is parallel to the drive direction.

With this brushless motor, the magnetic flux of the permanent magnet does not reach the coil portion (external coil portion) that is on the outside of the magnetic flux shielding member (on the farther side of the magnetic flux shielding member from the permanent magnet) because the magnetic flux of the permanent magnet is shielded by the magnetic flux shielding member, and so a driving force is not generated from this external coil portion. On the other hand, however, a driving force is generated from the coil portion (internal coil portion) that is on the inside of the magnetic flux shielding member (between the magnetic flux shielding member and the permanent magnet). Thus, by supplying the given drive current to the electromagnetic coil in the first current direction without changing the direction of the current supplied to the electromagnetic coil, it is possible to operate the brushless motor in the drive direction.

The electromagnetic coil may include a first coil and a second coil installed on opposite sides of the first permanent magnet, and the first and second coils may be arranged such that an electric current flowing in an inner coil portion of the first coil that is installed closer to the first permanent magnet than the magnetic flux shielding member, and an electric current flowing in an inner coil portion of the second coil that is installed closer to the first permanent magnet than the magnetic flux shielding member flow in a mutually parallel direction.

The brushless motor may further comprises: a driving force prevention member that prevents occurrence of driving force through electromagnetic interaction between a part of the electromagnetic coil and the first permanent magnet. The electromagnetic coil may have a first coil portion facing the first permanent magnet, and a second coil portion farther from the first permanent magnet than the first coil portion, and the driving force prevention member may allow electromagnetic interaction between the first coil portion and the first permanent magnet while preventing electromagnetic interaction between the second coil portion and the first permanent magnet.

With this brushless motor, electromagnetic interaction is generated between the first coil portion and the first permanent magnet but, because electromagnetic interaction is not generated between the first permanent magnet and the second coil portion that is farther than the first coil, by supplying the given drive current to the electromagnetic coil in the first current direction without changing the direction of the current supplied to the electromagnetic coil, it is possible to operate the brushless motor in the drive direction.

The driving force prevention member may be a second permanent magnet installed on opposite side of the first permanent magnet with regard to the second drive element, and the second permanent magnet may be arranged so that same poles of the first and second permanent magnets are mutually opposing.

With this configuration, because no electromagnetic interaction is generated through the influence of the second permanent magnet's magnetic field between the second coil portion and the first permanent magnet, the second permanent magnet functions as a driving force prevention member. In addition, with this configuration, because the electromagnetic interaction acts between the second permanent magnet and the second coil portion, it becomes possible to generate a driving force not only from the first coil portion but also from the second coil portion. As a result, it has the effect of being able to generate a greater driving force.

The electromagnetic coil may have a hollow core, or a core member composed of a non-magnetic material.

With this configuration, because there is no extra force acting between the core of the electromagnetic coil and the permanent magnet, it becomes possible to realize a smooth driving force.

The electromagnetic coil may have as a core member a magnet assembly which includes a magnetic material member and two permanent magnets installed on both sides of the magnetic material member such that same poles of the two permanent magnets are respectively attracted by the magnetic material member. The two permanent magnets of the magnet assembly may be arranged opposite to the first and second permanent magnets respectively such that different poles are mutually opposing.

With this configuration, because the magnetic field is strengthened at the position of the electromagnetic coil using the first and second permanent magnets, it becomes possible to increase the driving force.

The driving force prevention member may include a second permanent magnet as a core member of the electromagnetic coil, and the second permanent magnet may be arranged opposite to the first permanent magnet such that different poles are mutually opposing.

Even with this configuration, because no electromagnetic interaction is generated through the influence of the second permanent magnet's magnetic field between the second coil portion and the first permanent magnet, the second permanent magnet functions as a driving force prevention member.

The first permanent magnet may be a plate magnet with a thickness of dimension in a magnetization direction of the first permanent magnet.

With this configuration, it is possible to obtain a compact size and efficient brushless motor.

The drive control circuit may operate the brushless motor in a direction opposite to the drive direction by supplying a driving current to the electromagnetic coil in a direction opposite to the first electric current direction.

With this configuration, it is possible to arbitrarily reverse the brushless motor.

The first permanent magnet may have recesses or protrusions arranged along a direction that intersects with the drive direction.

In one embodiment, the brushless motor is a rotary motor, and the drive direction is a rotary direction.

In another embodiment, the brushless motor is a linear motor, and the drive direction is a linear direction.

According to another aspect of the present invention, there is provided an electronic device, comprising a brushless motor operable in a given drive direction; and a driven member driven by the brushless motor, The electronic device is a projector, for example.

According to another aspect of the present invention, there is provided a fuel cell equipped apparatus, comprising: a brushless motor operable in a given drive direction; a driven member driven by the brushless motor; and a fuel cell for supplying power to the brushless motor.

The present invention can be realized in a variety of forms. For example, it can be realized in the form of an electric motor and its control method, the actuator that uses that motor and control method, electronic equipment, mobile equipment, robots, etc.

BRIEF DESCRIPTION OF THE DRAWINGS

FIGS. 14A and 14B are cross-sectional drawings showing the configuration of the linear motor in the seventh example of the first embodiment.

FIGS. 15A and 15B are cross-sectional drawings showing the configuration of the linear motor in the eighth example of the first embodiment.

DESCRIPTION OF THE PREFERRED EMBODIMENT

The embodiments of the present invention will be described in the following order.

A. First Embodiment

B. Second Embodiment

C. Modification Examples

A. First Embodiment

Figure 1A:
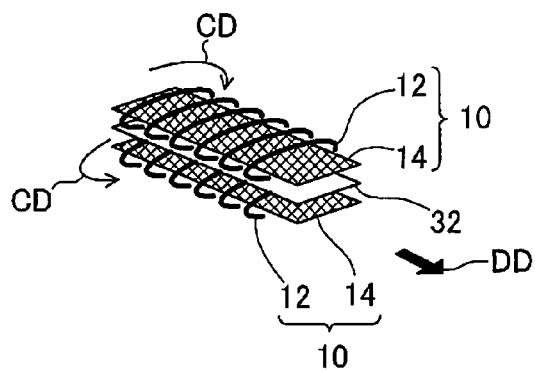
FIGS. 1A to 1C show examples of the configuration of the motor's permanent magnet and coil section.

FIG. 1A is a perspective view of a configuration of the permanent magnet and coil section used in the motor of the first embodiment. In this example, coil sections 10 are installed on both sides of the permanent magnet 32 in a position opposing the permanent magnet 32. Each coil section 10 is composed of a magnetic flux shielding member 14 and an electromagnetic coil 12 wound around the shielding member 14. The magnetic flux shielding member 14 can be made of a magnetic material, preferably with material of high magnetic permeability such as permalloy. The brushless motor's drive direction DD is shown in FIG. 1A. The electromagnetic coil 12 is wound around the magnetic flux shielding member 14, with the direction parallel to the motor's drive direction DD. The electromagnetic coil 12 is insulated.

Figure 1B:
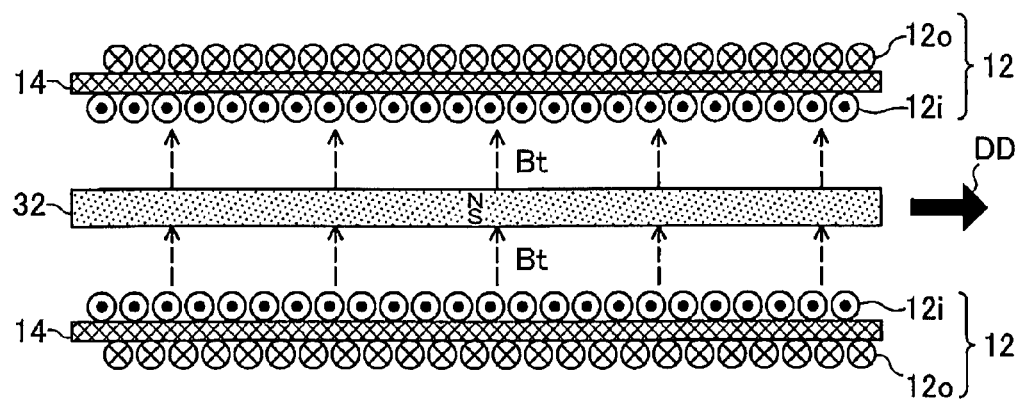

FIG. 1B is a front elevation view of the permanent magnet and coil sections. The permanent magnet 32 is a plate magnet and is magnetized in a direction perpendicular to the motor's drive direction DD. In other words, the direction of the magnetic flux Bt of the permanent magnet 32 is perpendicular to the drive direction DD.

In FIG. 1B, the electromagnetic coil 12 is drawn to include an internal coil portion 12$i$ that is closer to the permanent magnet 32 than the magnetic flux shielding member 14, and an external coil portion 12$o$ that is further away from the permanent magnet 32 than the magnetic flux shielding member 14. The differentiation of these coil portions 12$i$ and 12$o$ is purely for convenience sake and they are both part of the same coil that surrounds the magnetic flux shielding member 14. The mark of the black dot in a circle that indicates the internal coil portion 12$i$ signifies that the current flows from the back side of the drawing paper to the front side. In other words, with the two internal coil portions 12$i$ on both sides of the permanent magnet 32, the current flows in the same direction. The mark "x" in a circle that indicates the external coil portion 12$o$ signifies that the current flows from the front side of the drawing paper to the back side. This current direction CD is shown in FIG. 1A.

Figure 1C:
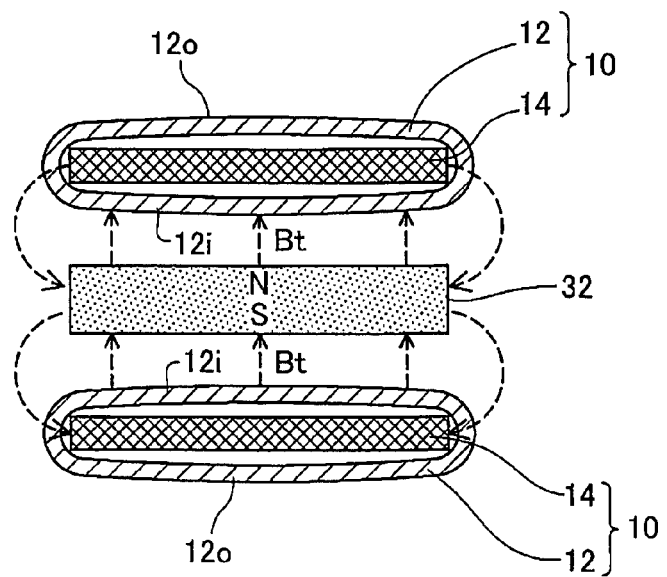

When a motor is configured with a stator including the coil section 10, a force is generated in the drive direction DD from the electromagnetic coil 12 to the permanent magnet 32 by the current that flows to the internal coil portion 12$i$ and the magnetic flux Bt of the permanent magnet 32. On the other hand, because the magnetic flux shielding member 14 shields the magnetic flux Bt of the permanent magnet 32, the magnetic flux Bt of the permanent magnet 32 does not reach the external coil portion 12$o$. FIG. 1C is a side view of FIG. 1B as seen from the drive direction DD. As indicated by the broken lines in FIG. 1C, the magnetic flux shielding member 14 shields the magnetic flux Bt and almost none reaches the external coil portion 12$o$. Because there is no driving force generated from the external coil portion 12$o$ due to the effect of this magnetic flux shielding member 14, it can be understood that the driving force from the internal coil portion 12$i$ acts as the motor's driving force.

With the configuration in FIGS. 1A to 1C, one of the two coil sections 10 may be omitted. However, if coil sections 10 are installed on each side of the permanent magnet 32, the driving force can be almost doubled, and it is possible to reduce the possibility of occurrence of a driving force in a direction other than drive direction DD. In order to also efficiently generate the motor's driving force, it is preferable that both the permanent magnet 32 and the magnetic flux shielding member 14 be configured as plate-like members that make their direction of thickness the same as the magnetized direction of the permanent magnet 32. In addition, it is possible to reduce the size of the brushless motor (especially the thickness) if a plate-type of magnetic flux shielding member 14 like this is used.

Although the insulated electromagnetic coil 12 is wound directly around the magnetic flux shielding member 14 with the configuration in FIGS. 1A to 1C, it is possible to install a bobbin around which the electromagnetic coil 12 is to be wound in order to improve insulation quality. Various types of configurations may be employed for the bobbin's structure, such as including a magnetic flux shielding member. For example, magnetic flux shielding 14 may be inserted inside a hollow bobbin. Or, the bobbin itself may be configured with magnetic flux shielding material.

Figure 2:
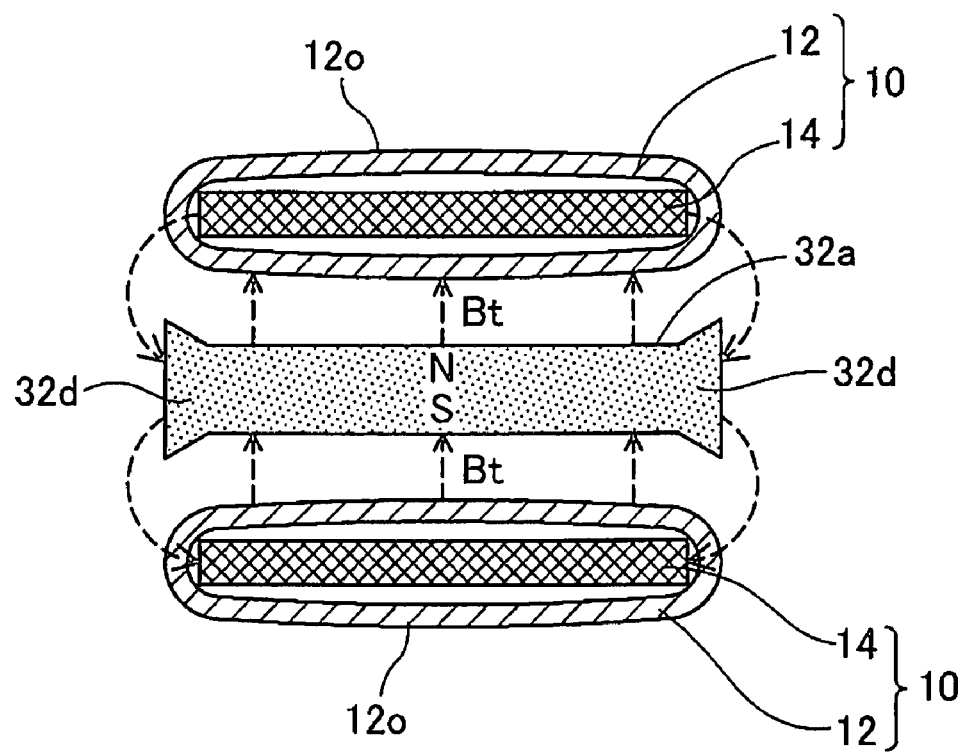
FIG. 2 shows a modified example of the permanent magnet.

FIG. 2 corresponds to FIG. 1C and shows an example of a modified shape of the permanent magnet 32. This permanent magnet 32$a$ has a trapezoidal portion 32$d$ that spreads in a roughly trapezoidal shape (or roughly fan shape) on both sides. This trapezoidal portion 32$d$ will cause the length of those coil portions, from among the electromagnetic coils 12 and that generate a valid driving force, to be elongated more than the configuration in FIG. 1C. As a result, it is possible to generate a driving force with greater efficiency.

Figure 3A:
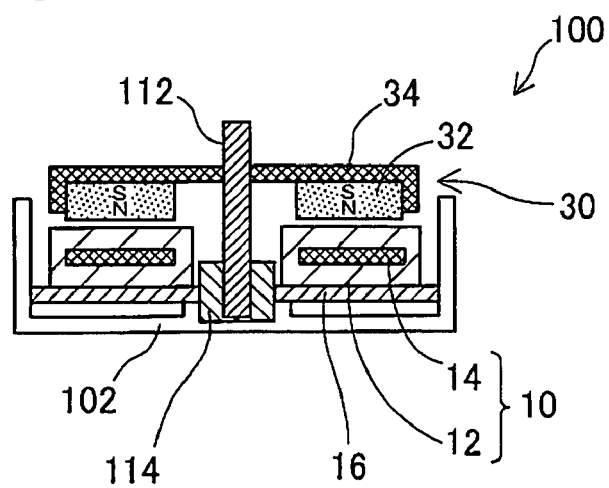
FIGS. 3A to 3C are cross-sectional drawings showing the configuration of the rotary motor as the first example of the first embodiment.
Figure 3B:
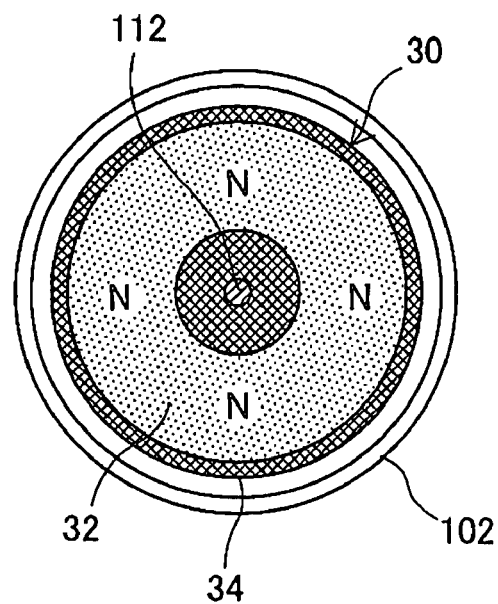
Figure 3C:
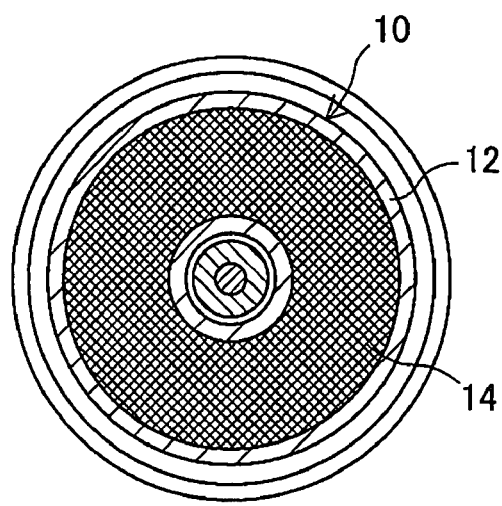

FIG. 3A is a cross-sectional drawing showing the configuration of the rotary brushless motor as the first example of the first embodiment of the present invention. This motor 100 has a stator including a coil section 10, and a rotor section 30 including a permanent magnet 32. As shown in FIG. 3B, the rotor section 30 contains a plate-like permanent magnet 32 with a flat ring shape. The center of the rotor section 30 is fixed to a rotating axis 112. The rotating axis 112 is held by a bearing section 114. A magnetic yoke member 34 is installed around the circumference of the permanent magnet 32. The magnetic yoke member 34 may be omitted. FIG. 3C shows a cross section of the stator including the coil section 10. The magnetic flux shielding member 14 is a plate-like member with a flat ring shape. The electromagnetic coil 12 passes through the center hole of the magnetic flux shielding member 14 and is wound around the circular center of the magnetic flux shielding member 14. The electromagnetic coil 12 may, for example, be formed by a flat coil wound with a long, thin, sheet-like conducting wire, but it is simplified in each drawing of this specification. As shown in FIG. 3A, the electromagnetic coil 12 is set on a substrate or a circuit board 16. The stator, which is composed of a coil section 10 and the substrate 16, is fixed to the casing 102 of the motor 100.

Figure 4A:
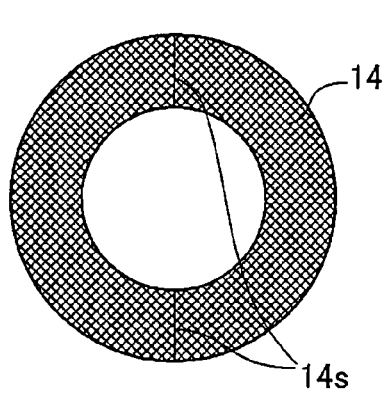
FIGS. 4A to 4E show concrete examples of the shape of the magnetic flux shielding member and the electromagnetic coil.
Figure 4B:
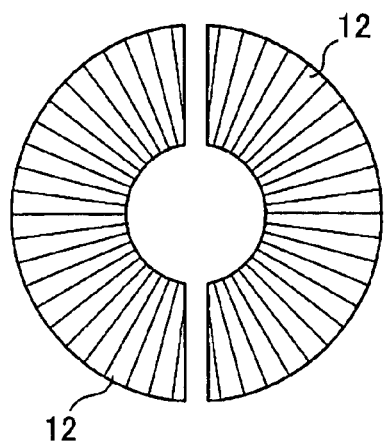
Figure 4C:
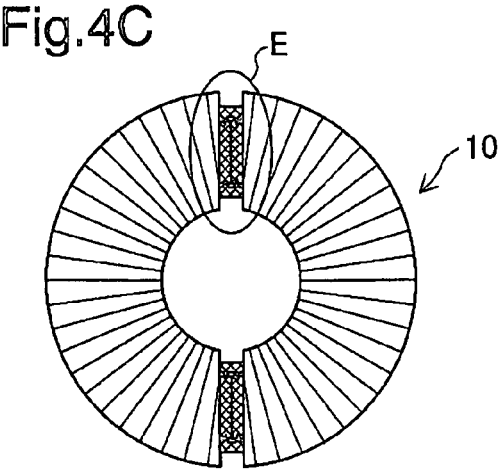
Figure 4D:
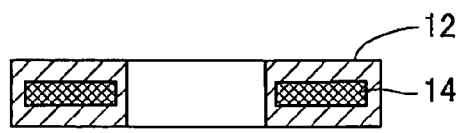
Figure 4E:
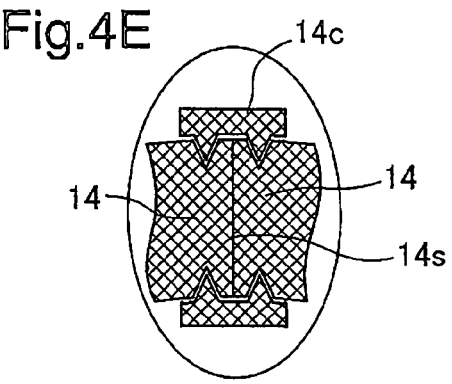
Figure 5A:
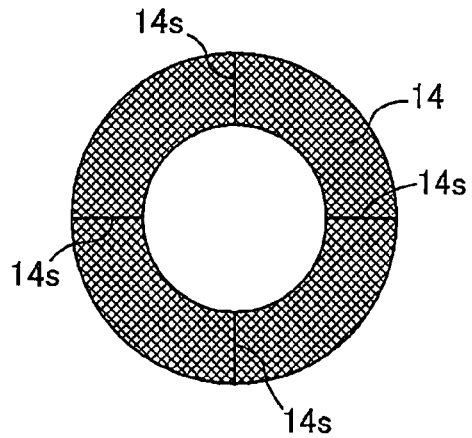
FIGS. 5A to 5E show examples of other shapes of the magnetic flux shielding member and the electromagnetic coil.
Figure 5B:
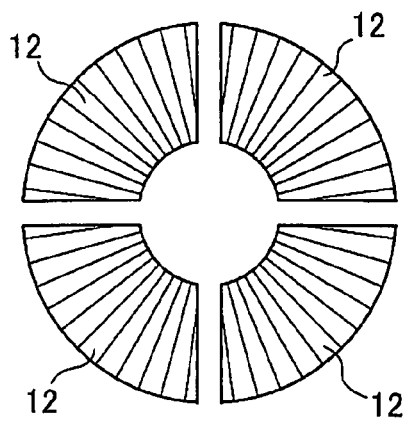
Figure 5C:
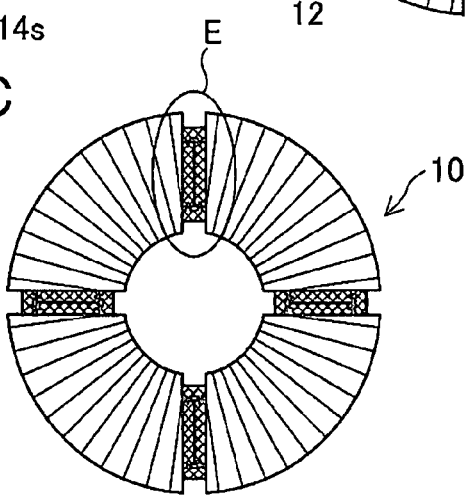
Figure 5D:
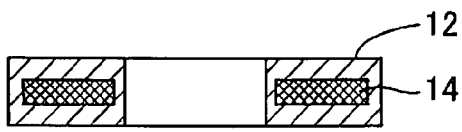
Figure 5E:
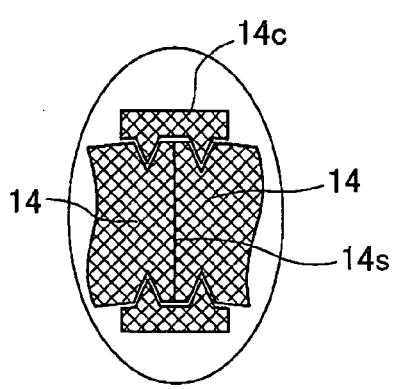

FIGS. 4A to 4C show a concrete example of the shape of the magnetic flux shielding member 14 and the electromagnetic coil 12. As shown in FIGS. 4A and 4B, the magnetic flux shielding member 14 and the electromagnetic coil 12 are each composed of two elements with a half-ring shape. The boundary of the half-ring members that comprise the magnetic flux shielding member 14 has a divider section 14s. FIG. 4C is a top view showing the combined form of the magnetic flux shielding member 14 and the electromagnetic coil 12, and FIG. 4D is its cross-sectional drawing. As shown in FIG. 4D, the two magnetic flux shielding members 14 are each inserted into the space or hole in the electromagnetic coil 12 and are then are mutually coupled as shown in FIG. 4C. FIG. 4E shows an enlarged view of the area marked as E in FIG. 4C. Here, wedge-shaped connecting members 14c are inserted into the top and bottom of the divider section 14s, and through these, the half-ring magnetic flux shielding members 14 are mutually connected.

FIGS. 5A to 5E show examples of shapes when the magnetic flux shielding member 14 and the electromagnetic coil 12 are each divided into fourths. As can be understood by these examples, it is possible to realize not only a motor that uses a straight plate-like permanent magnet 32 and magnetic flux shielding member 14 like that shown in FIG. 1A, but also a motor that uses a curved permanent magnet and magnetic flux shielding member.

Figure 6:
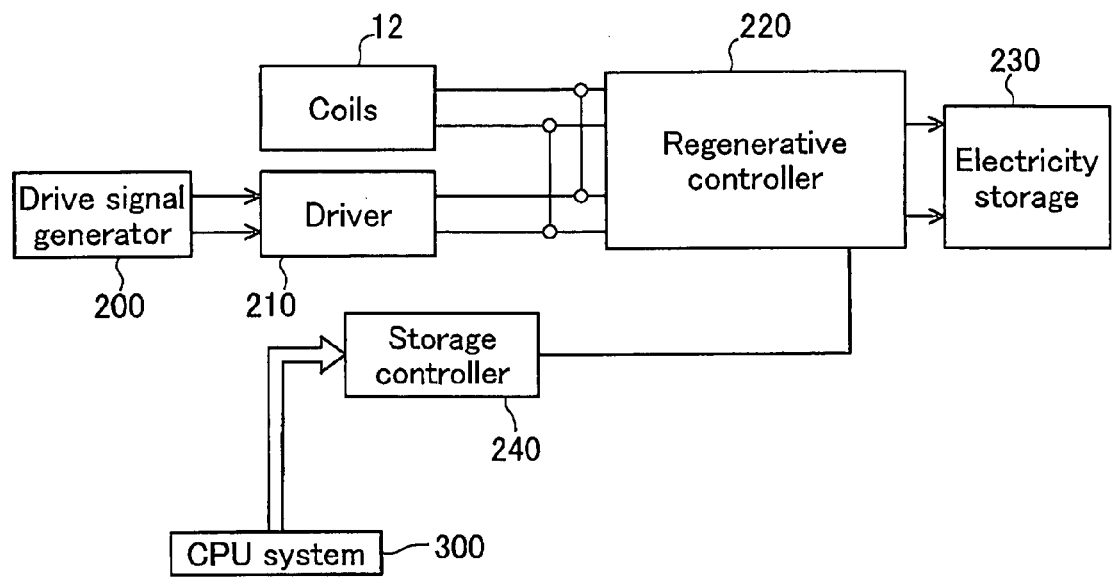
FIG. 6 is a block drawing showing the configuration of the brushless motor's drive control circuit.

FIG. 6 is a block drawing showing an example configuration of the brushless motor's drive control circuit. This drive control circuit is equipped with a CPU system 300, a drive signal generator 200, a driver circuit 210, a regenerative controller 220, an electricity storage 230, and a storage controller 240. The drive signal generator 200 generates the drive signal that is supplied to the driver circuit 210.

Figure 7:
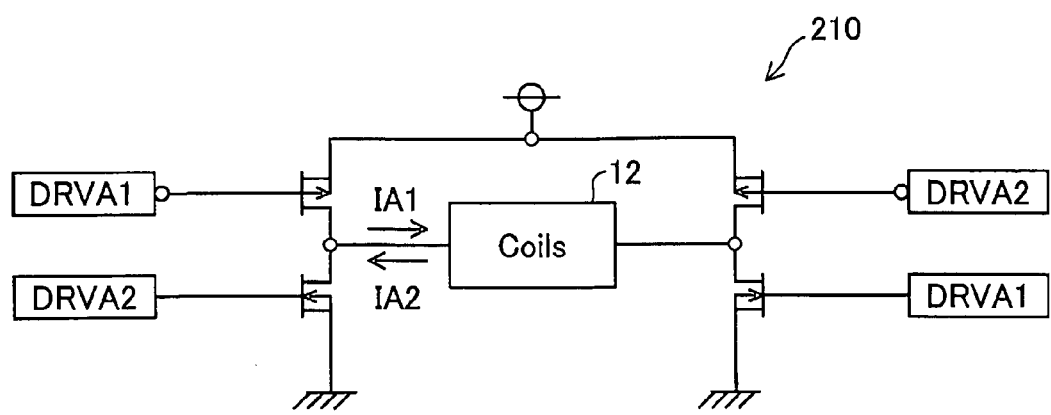
FIG. 7 is a circuit drawing showing the configuration of the driver circuit.

FIG. 7 is a circuit drawing showing the configuration of the driver circuit 210. This driver circuit 210 is composed of an H-bridge circuit. Either the first drive signal DRVA1 or the second drive signal DRVA2 is supplied from the drive signal generator 200 to the driver circuit 210. The current IA1 and IA2 shown in FIG. 7 indicate the direction that the current (also called the "drive current") flows in accordance with these drive signals DRVA1 or DRVA2. For example, when current IA1 flows according to the first drive signal DRVA1, the motor operates in the first drive direction. When current IA2 flows according to the second drive signal DRVA2, the motor operates in the second drive direction, opposite to the first drive direction. This first drive direction is, for example, the direction shown by the arrow DD in FIG. 1A. Or, in the case of a rotary motor like that in FIGS. 3A to 3C, the first drive direction may, for example, be a right rotation and the second drive direction a left rotation. It is possible to use, for example, a constant ON signal or a cyclical pulse signal as the drive signals DRVA1 and DRVA2.

It is also possible to configure the drive signal generator 200 so that only one of the two drive signals DRVA1 and DRVA2 is generated. In this case, the motor can only operate in one direction but this is sufficient, for example, in cases such as when installing a fan motor.

Figure 8:
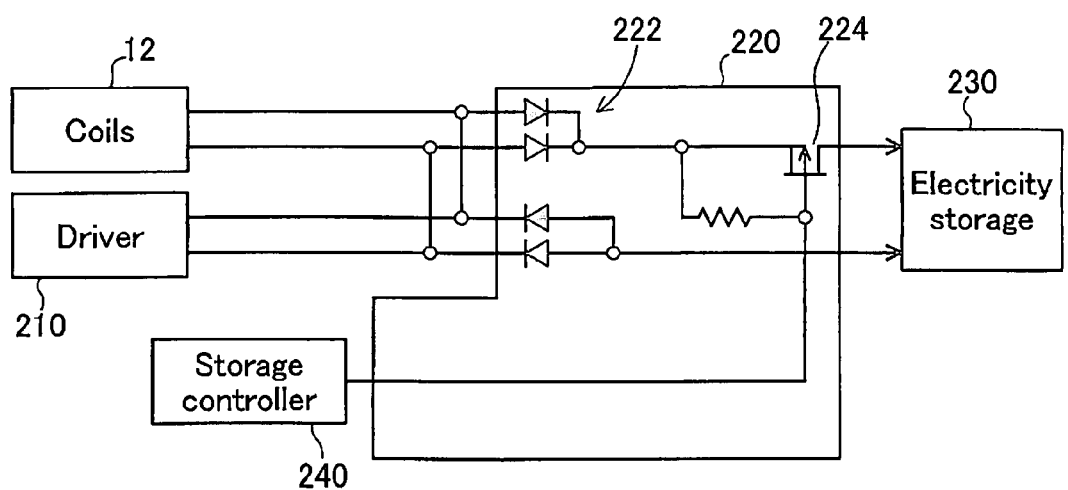
FIG. 8 is a circuit drawing showing the internal configuration of the regenerative controller.

FIG. 8 is a circuit drawing showing the internal configuration of the regenerative controller 220. The regenerative controller 220 is connected parallel to the driver circuit in regard to the electromagnetic coil 12. The regenerative controller 220 is equipped with a commutation circuit 222 composed of diodes, and a switching transistor 224. Once the switching transistor 224 is activated by the storage controller 240, it is possible to recover the electrical power generated by the electromagnetic coil 12 and recharge the electricity storage 230. It is also possible to supply the electromagnetic coil 12 with current from the electricity storage 230. The regenerative controller 220, electricity storage 230, and storage controller 240 may be omitted.

In this way, with the brushless motor of the first example of the first embodiment, because the magnetic flux shielding member 14 is installed in a position opposing the permanent magnet 32 and the electromagnetic coil 12 is wound around the outside of the magnetic flux shielding member 14, it is possible to generate a force to the motor in a given drive direction by applying a one-directional current flow to the electromagnetic coil 12. In other words, the brushless motor of the present example may be operated without having to use a control circuit to switch the direction of the drive voltage or drive current.

Figure 9A:
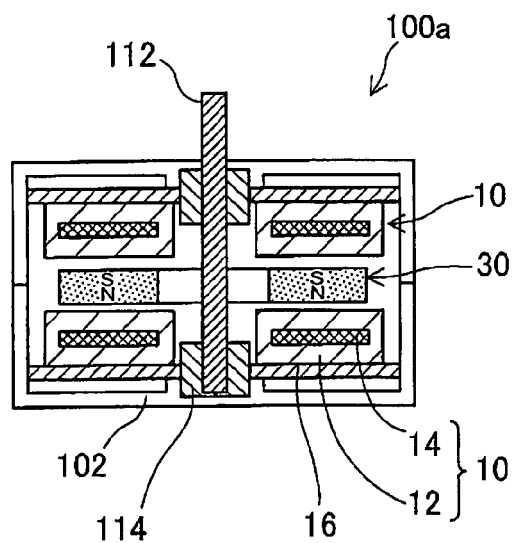
FIGS. 9A to 9C are cross-sectional drawings showing the configuration of the rotary motor in the second example of the first embodiment.
Figure 9B:
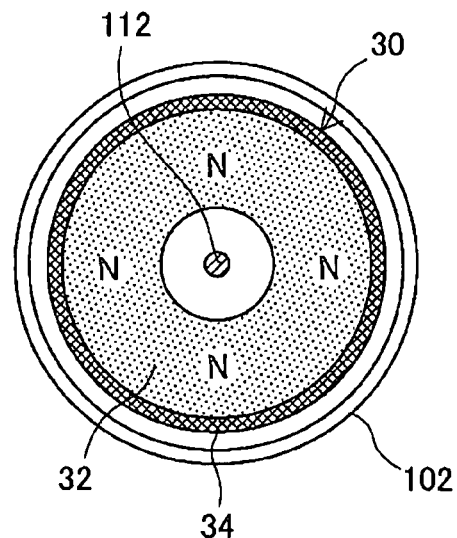
Figure 9C:
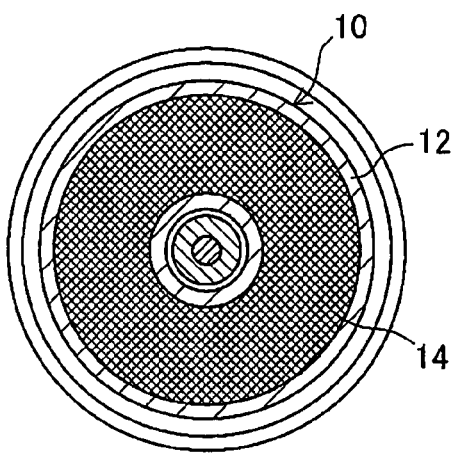

FIGS. 9A to 9C show the configuration of the rotary brushless motor in the second example of the first embodiment. This motor 100a has stators each including a coil section 10, installed on both the top and bottom of the rotor section of the motor of the first example of the first embodiment shown in FIG. 3A, while other points are the same as the first example shown in FIGS. 3A to 3C. The motor in this second example can generate a driving force of approximately twice that of the motor in the first example.

Figure 10A:
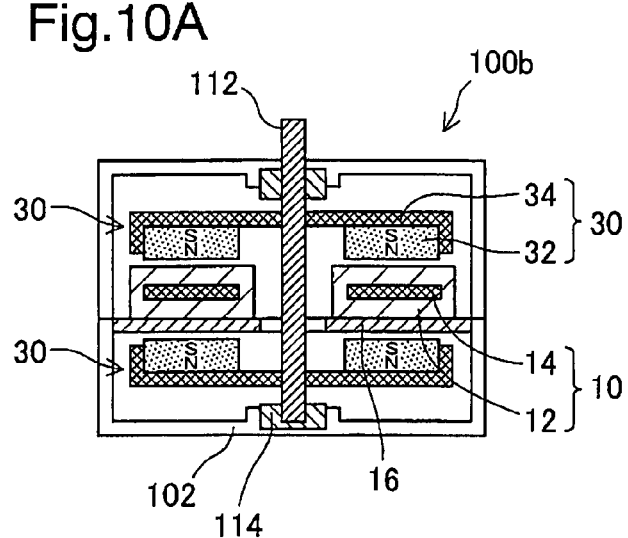
FIGS. 10A to 10C are cross-sectional drawings showing the configuration of the rotary motor in the third example of the first embodiment.
Figure 10B:
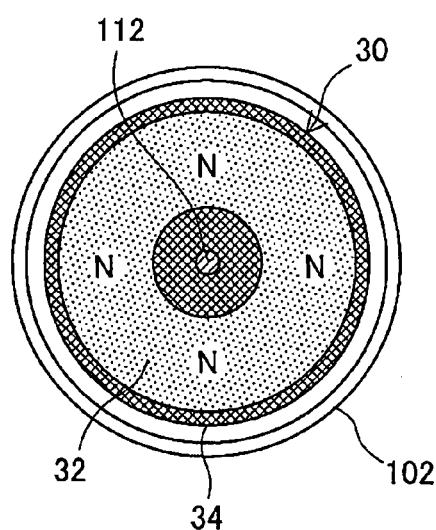
Figure 10C:
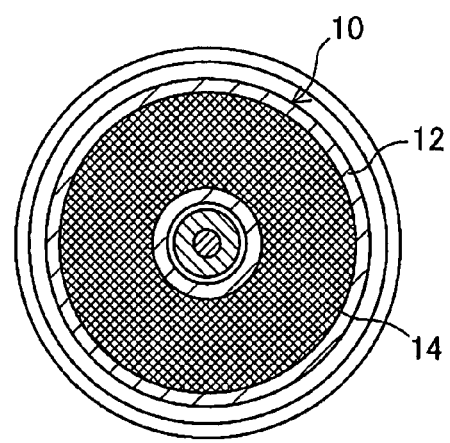

FIGS. 10A to 10C show the configuration of the rotary brushless motor in the third example of the first embodiment. This motor 100b is composed of rotor sections 30 installed on both the top and bottom of the stator, which contains a coil section 10. With this motor, it is possible to generate a valid driving force from both the coil portion on the top and the coil portion on the bottom of the magnetic flux shielding member 14. It is, therefore, possible to improve efficiency even more than in the first example shown in FIGS. 3A to 3C and the second example shown in FIGS. 9A to 9C.

Figure 11:
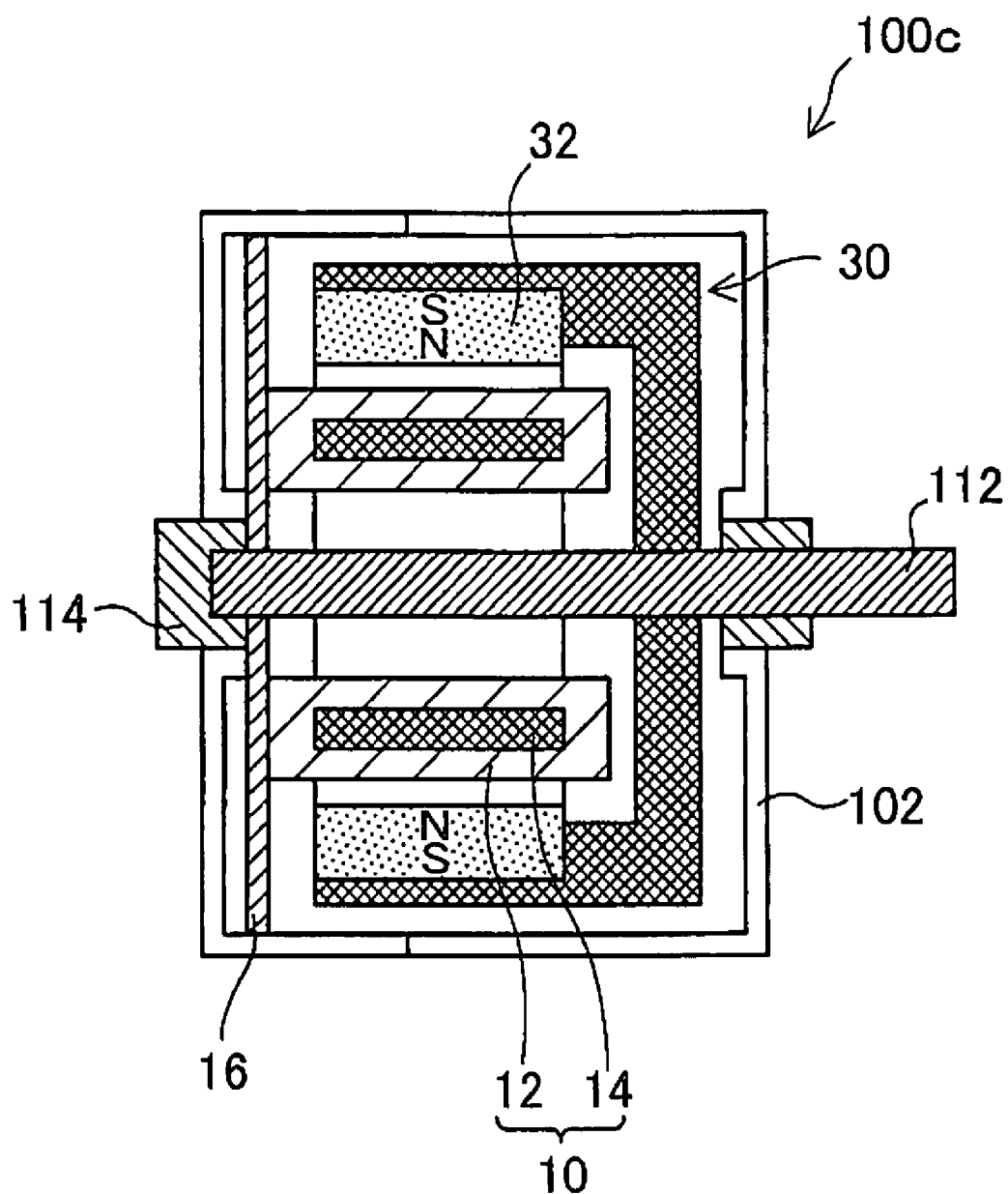
FIG. 11 is a cross-sectional drawing showing the configuration of the rotary motor in the fourth example of the first embodiment.

FIG. 11 shows the configuration of the rotary brushless motor in the fourth example of the first embodiment. This motor 100c is composed such that a rotor section 30 including a hollow cylindrical permanent magnet 32, and a stator including a coil section 10 form concentric cylinders about a rotating axis 112. This kind of motor can also generate a valid driving force in line with the principal explained in FIGS. 1A to 1C.

Figure 12:
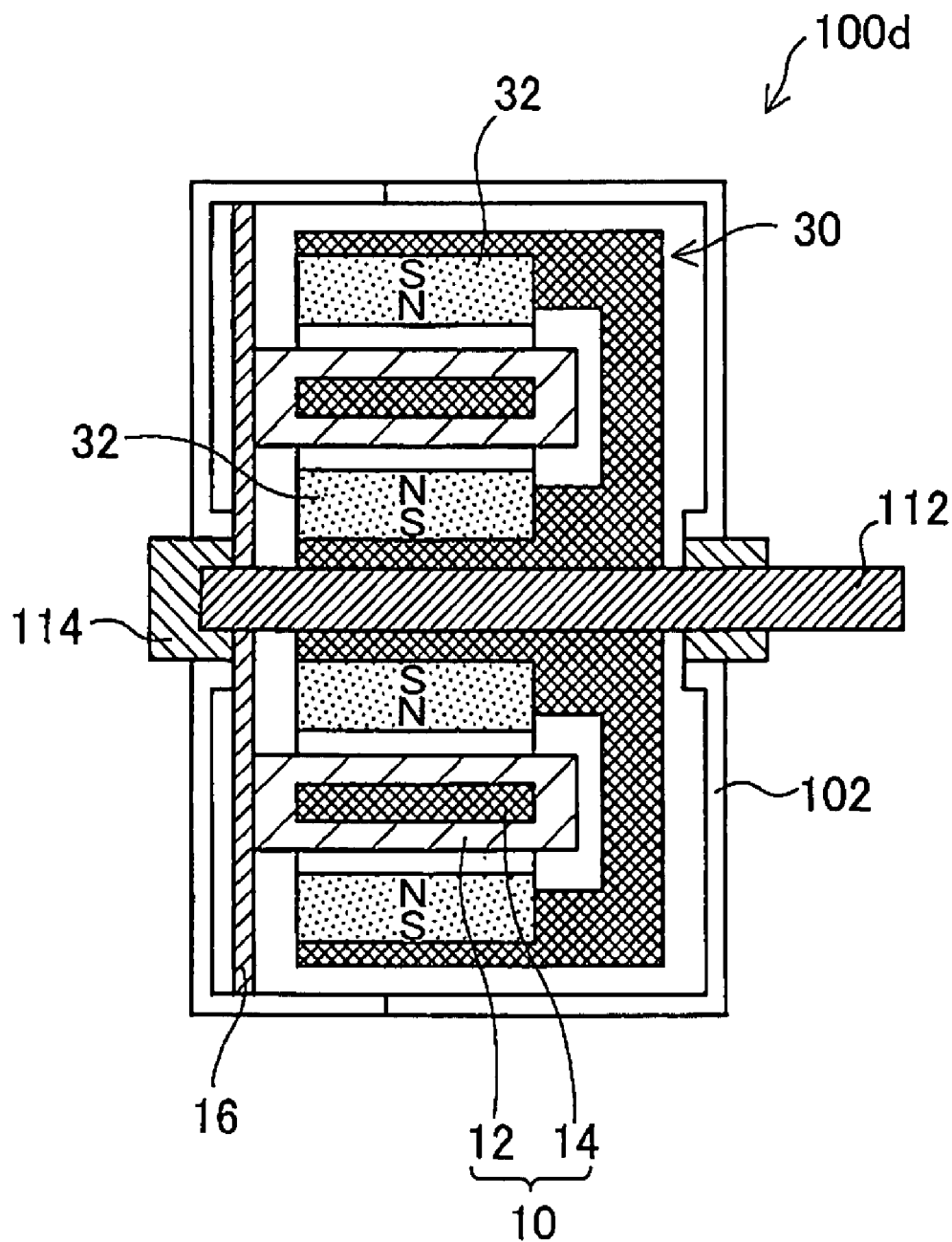
FIG. 12 is a cross-sectional drawing showing the configuration of the rotary motor in the fifth example of the first embodiment.

FIG. 12 shows the configuration of the rotary brushless motor in the fifth example of the first embodiment. This motor 100d replaces the rotor section 30 of the fourth example shown in FIG. 11 with a dual-layered cylindrical rotor section, which includes additional permanent magnets 32 at its inner side of the stator. In the same way as with the motor shown in FIG. 10, is possible to generate a valid driving force from both sides of the coil with this configuration, and to achieve an efficient motor.

Figure 13A:
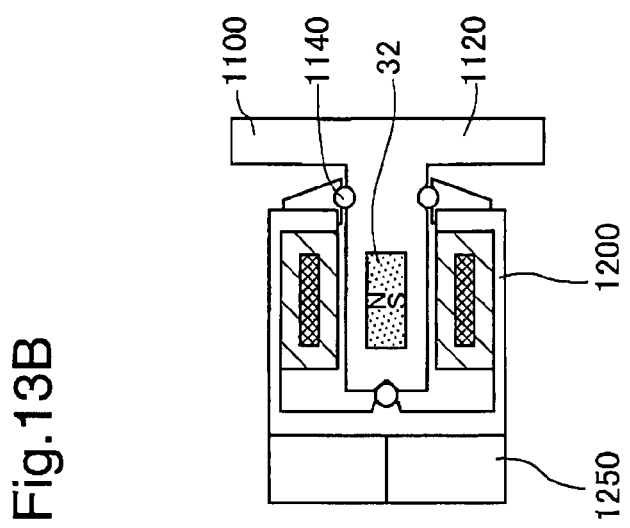
FIGS. 13A and 13B are cross-sectional drawings showing the configuration of the linear motor in the sixth example of the first embodiment.
Figure 13B:
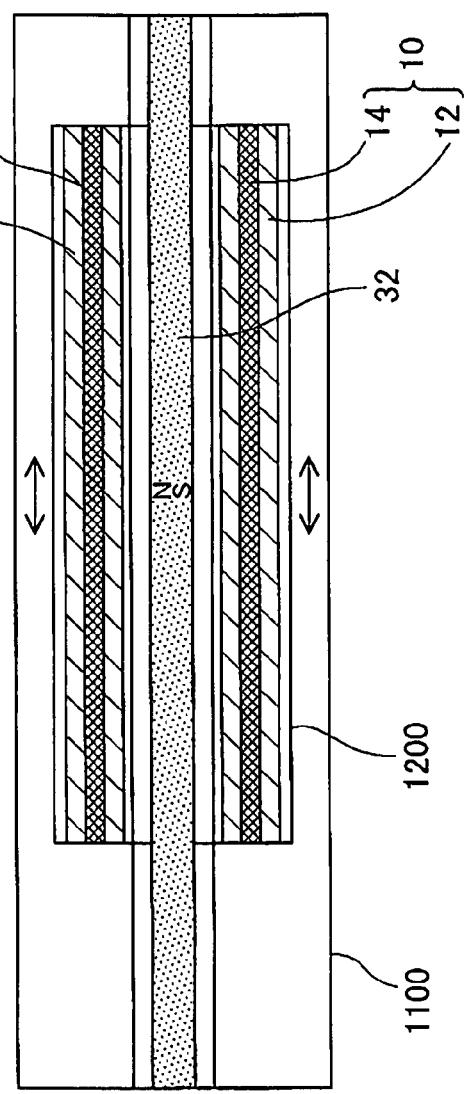

FIGS. 13A and 13B show the configuration of the linear motor in the sixth example of the first embodiment. This linear motor 1000 is equipped with a fixed guide section 1100 and a moving section 1200. As shown in FIG. 13A, a plate-like permanent magnet 32 that extends in the moving direction is installed at the center of the fixed guide section 1100. The moving section 1200 is configured to be on both sides of the fixed guide section 1100 in the vertical directions, and has coil sections 10, which include a magnetic flux shielding member 14 and a coil 12, installed both above and below the permanent magnet 32. As shown in FIG. 13B, the moving section 1200 is equipped with a drive controller 1250. The drive controller 1250 includes a self-contained power supply (omitted in the drawing), such as a fuel cell, etc. The fixed guide section 1100 is installed with a rail 1120 that guides the moving section 1200. The moving section 1200 is held on the rail 1120 in a slidable state by the bearing section 1140. This type of linear motor is also a feasible embodiment of the brushless motor of the present invention.

FIGS. 14A and 14B show the configuration of the linear motor in the seventh example of the first embodiment. The configuration of the fixed guide section 1100 on this linear motor 1010 differs from that of the sixth example shown in FIGS. 13A and 13B. Specifically, in this seventh example, two permanent magnets 32 are installed on both sides of the magnetic yoke member 34 at the center of the fixed guide section 1100. The magnetized direction of these two magnets 32 may be the same or they may be opposite. Permanent magnets 32 and magnetic yoke members 34 are also installed on the outside of the moving section 1200 that are on both sides of the fixed guide section 1100. In the seventh example, by employing these four permanent magnets 32, it is possible to effectively utilize each of the coil portions (the internal coil portion 12i and external coil portion 12o explained in FIG. 1B) on the top and bottom of the two coil sections 10.

FIGS. 15A and 15B show the configuration of the linear motor in the eighth example of the first embodiment. This linear motor 2000 is equipped with a fixed guide sections 2100 and a moving section 2200. As shown in FIG. 15A, a plate-like magnetic flux shielding member 14 that extends in the moving direction is installed at the center of the moving section 2200 and an electromagnetic coil 12 is wound around that. The fixed guide section 2100 is configured to be on both sides of the moving section 1100 in the vertical directions, and two permanent magnets 32 are installed in opposing positions. As shown in FIG. 15B, the moving section 2200 is equipped with a drive controller 2250. The drive controller 2250 includes a self-contained power supply (omitted in the drawing), such as a fuel cell, etc. The fixed guide section 2100 is equipped with a rail 2120 that guides the moving section 2200. The moving section 2200 is held in the rail 2120 in a slidable state by the bearing section 2140. This linear motor uses permanent magnets in the fixed guide section and an electromagnetic coil in the moving section; this relationship is switched from that of the sixth example shown in FIGS. 13A and 13B. As can be understood from the various examples of the first embodiment noted above, the brushless motor in the first embodiment of the present invention can be realized with various mechanical structures by employing the configurations for the coil section shown in FIGS. 1A to 1C and FIG. 2, as well as configurations similar to that.

B. Second Embodiment

Figure 16A:
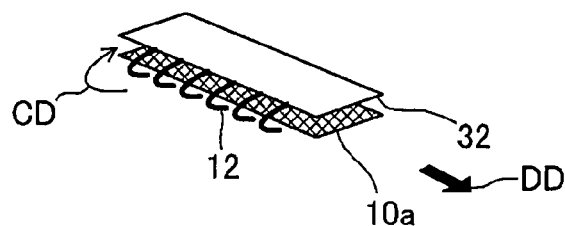
FIGS. 16A to 16C show the first configuration example of the motor's permanent magnet and coil section in the second embodiment.

FIG. 16A is a perspective view of the first configuration example of the permanent magnet and coil section used in the brushless motor in the second embodiment. In this example configuration, a permanent magnet 32 and a coil section 10a including an electromagnetic coil are installed in opposing positions. The drive direction DD of the brushless motor is shown in FIG. 16A. It can be understood that the electromagnetic coil 12 is wound with the direction parallel to the motor's drive direction DD. The electromagnetic coil 12 is insulated.

Figure 16B:
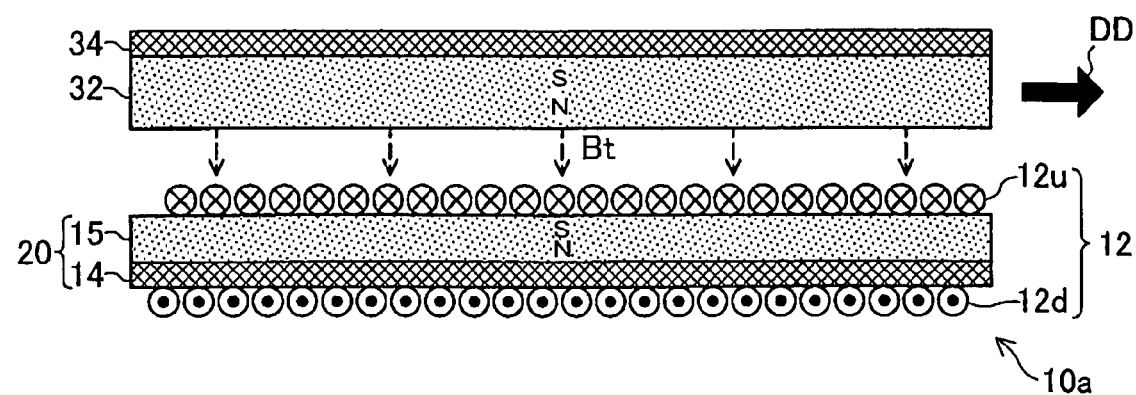
Figure 16C:
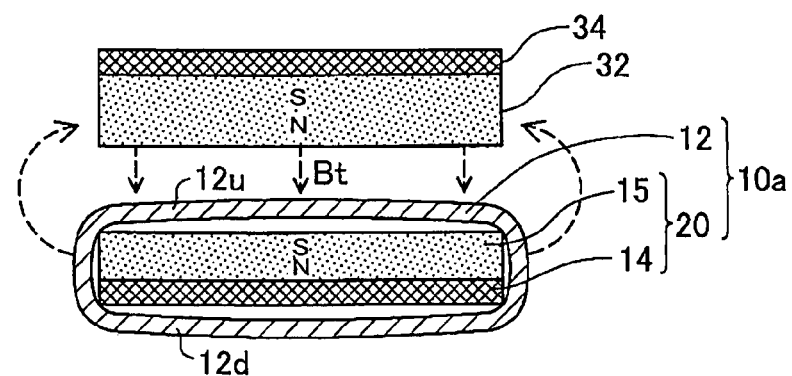

FIG. 16B is a front elevation view of the permanent magnet and coil section. FIG. 16C is a side view of FIG. 16B as seen from the drive direction DD. As shown in these drawings, it is preferable for a magnetic yoke 34 to being installed on the back of the permanent magnet 32, or on the opposite side of the coil section 10. The permanent magnet 32 is a plate magnet and is magnetized in a direction perpendicular to the motor's drive direction DD (the vertical direction in FIGS. 16B and 16C). In other words, the direction of the magnetic flux Bt of the permanent magnet 32 is perpendicular to the drive direction DD. The coil section 10a has a core member 20 composed of a magnetic material member 14 and a permanent magnet 15 installed on top of the magnetic material member 14. The electromagnetic coil 12 is wrapped around this core member 20. Permanent magnets 15 and 32 or positioned so that their poles are mutually opposing. In the examples in FIGS. 16B and 16C, the N pole of the permanent magnet 32 and the S pole of the permanent magnet 15 are opposing, but it is possible to reverse these. The magnetic material member 14 can be made of any of a variety of magnetic materials, preferably with material of high magnetic permeability such as permalloy.

In FIG. 16B, the electromagnetic coil 12 is drawn to include an upper coil portion 12u which is on the side close to the permanent magnet 32, and a lower coil portion 12d which is on the far side from the permanent magnet 32. The differentiation of these coil portions 12u and 12d is purely for convenience sake and they are both part of the same coil that surrounds the core member 20. The mark "x" in a circle that indicates the upper coil portion 12u signifies that the current flows from the front side of the drawing paper to the back side. The mark (black dot in a circle) that indicates the lower coil portion 12d signifies that the current flows from the back side of the drawing paper to the front side. This current direction CD is shown in FIG. 16A.

As shown in FIGS. 16B and 16C, the magnetic flux Bt from the permanent magnet 32 reaches the upper coil portion 12u. Therefore, if current flows to the upper coil portion 12u, electromagnetic interaction acts between that current and the permanent magnet 32, and a driving force is generated. On the other hand, the core member 20 almost completely shields the magnetic field coming from the permanent magnet 32, and the magnetic field is prevented from reaching the lower coil portion 12d. Therefore, even if the current flows to the lower coil portion 12d, almost no electromagnetic interaction is generated with the permanent magnet. To phrase it another way, while allowing electromagnetic interaction to be generated between the upper coil portion 12u and the permanent magnet 32, this core member 20 functions as an element to prevent the generation of a driving force and prevents the generation of electromagnetic interaction between the lower coil portion 12d and the permanent magnet 32. Either the magnetic material member 14 or the permanent magnet 15 that comprise the core member 20 may be omitted.

In order to also efficiently generate the motor's driving force, it is preferable that both the permanent magnet 32 and the core member 20 be configured as plate-like members that make their direction of thickness the same as the magnetized direction of the permanent magnet 32. In addition, it is possible to reduce the size of the brushless motor (especially the thickness) if a plate-type member like this is used.

Although the insulated electromagnetic coil 12 is wound directly around the core member 20 with the configuration in FIGS. 16A to 16C, a bobbin may be installed around which the electromagnetic coil 12 it to be wound in order to improve insulation quality. Various types of configurations can be employed for the bobbin's structure, such as including a core member. For example, a core member 20 may be inserted inside a hollow bobbin. Or, the bobbin itself may be configured with a core member 20.

Figure 17A:
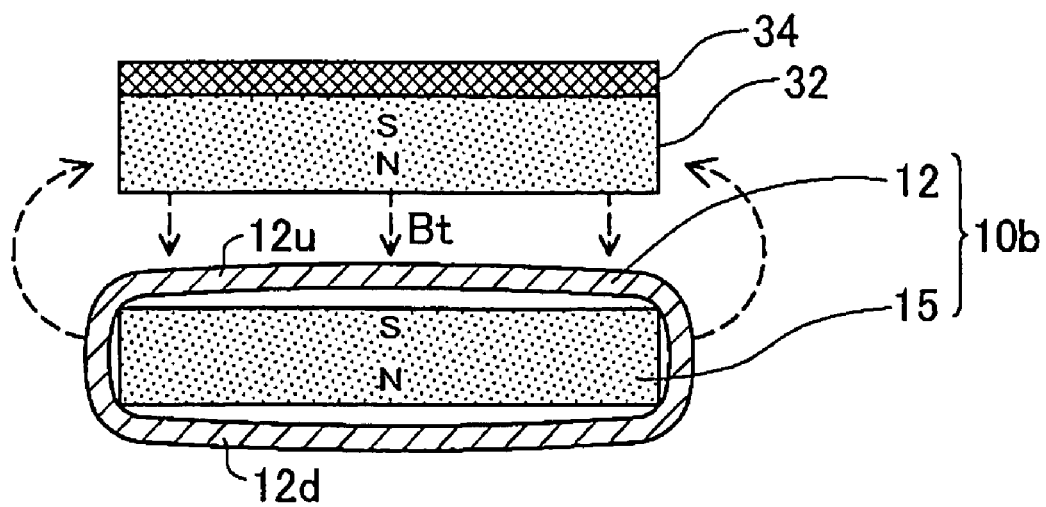
FIGS. 17A and 17B are explanatory drawings showing modified examples of the core member in the first configuration example of the second embodiment shown in FIGS. 16A to 16C.
Figure 17B:
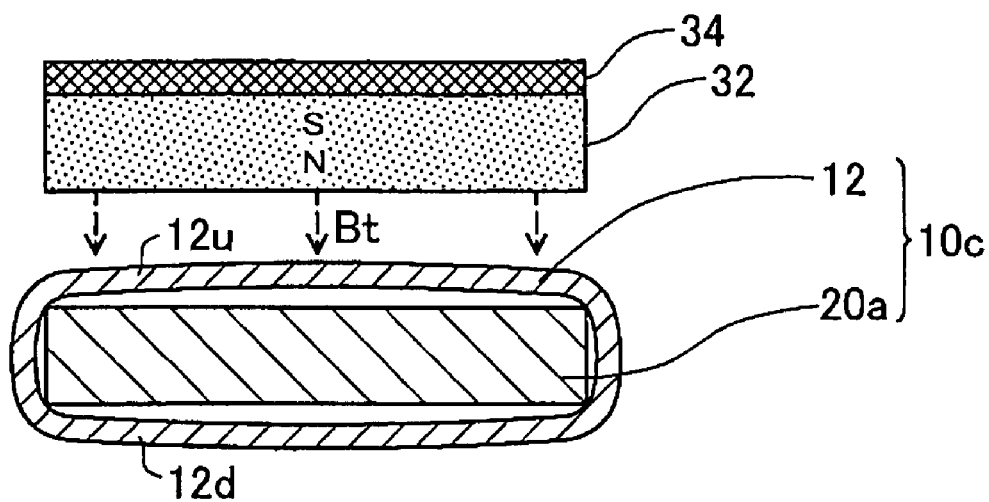

FIGS. 17A and 17B are explanatory drawings showing modified examples of the core member in the first configuration example shown in FIGS. 16A to 16C. The core section 10b in FIG. 17A omits the magnetic material member 14 from the core section 10a in FIG. 16A. Even this configuration has almost the same effect as that shown in FIGS. 16A to 16C. The coil section 10c shown in FIG. 17B adopts a non-magnetic member as the core member 20a. Even if a core member made of a non-magnetic material is used, a difference in the driving force will exist between the upper coil portion 12u and lower coil portion 12d. In other words, because the upper coil portion 12u is closer to the magnet 32, it generates a larger driving force than the lower coil portion 12d. Therefore, a net driving force is generated by the difference in the driving force between these coil portions 12u and 12d. As a result, is possible to operate the motor in a given drive direction by having the current continue to flow in the same direction.

Figure 18A:
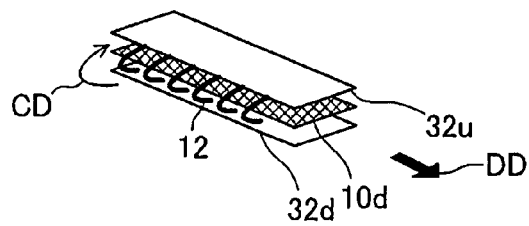
FIGS. 18A to 18D show the second configuration example of the motor's permanent magnet and coil section in the second embodiment.
Figure 18B:
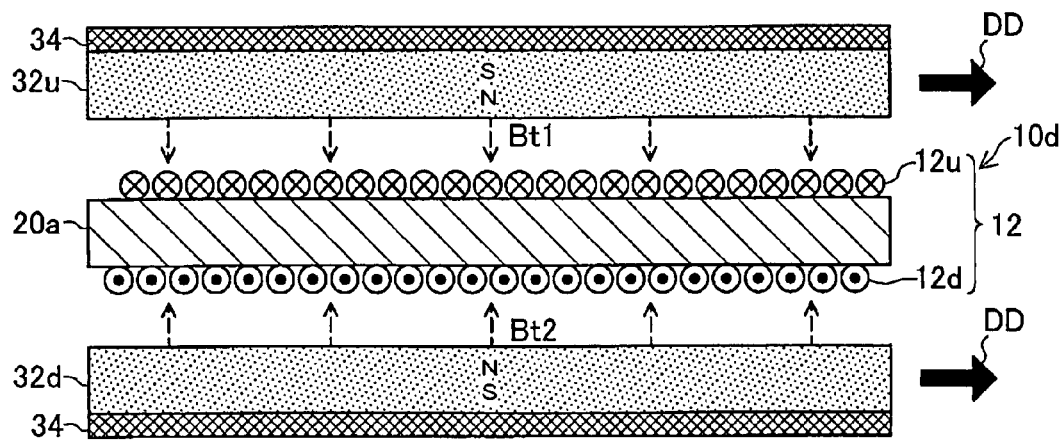
Figure 18C:
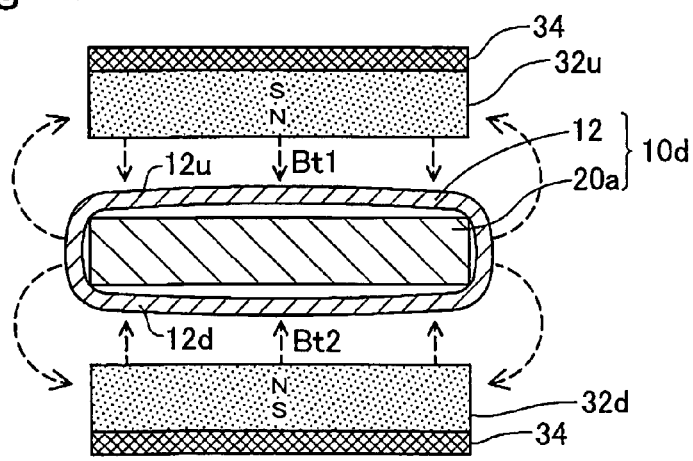

FIGS. 18A to 18C are perspective views showing the second configuration example of the permanent magnet and coil section in the second embodiment. In this configuration example, two permanent magnets, 32u and 32d, are installed on the top and bottom of the coil section 10d. These two permanent magnets, 32u and 32d, are positioned so that the same poles are mutually opposing. In these examples, both N poles are mutually opposing, but it is possible to make the S poles mutually opposing.

FIG. 18B is a front elevation view of the permanent magnet and coil sections. FIG. 18C is a side view of FIG. 18B. As shown in these drawings, it is preferable for a magnetic yoke 34 to being installed on the back of each of the permanent magnets 32u and 32d, or on the opposite sides of the coil section 10d. The coil section 10d has an electromagnetic coil 12 wrapped around the outside of the core member 20a. This core member 28 is composed of non-magnetic material. It is possible to use, for example, plant resin, carbon resin such as glass carbon, CFRP (Carbon Fiber Reinforced Plastic), carbon fibers, etc., ceramics such as Steatite, alumina, zirconia, etc., as non-magnetic material. As shown in FIG. 18B, the magnetic flux Bt1 of the first permanent magnet 32u reaches the upper coil portion 12u of the electromagnetic coil 12, but does not reach the lower coil portion 12d. Conversely, the magnetic flux Bt2 of the second permanent magnet 32d reaches the lower coil portion 12d, but does not reach the upper coil portion 12u.

Figure 18D:
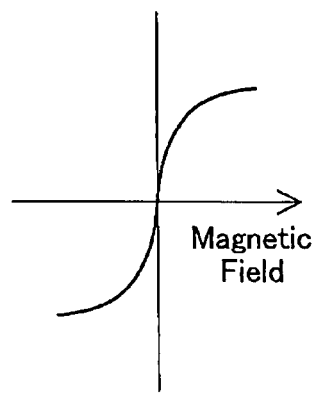

FIG. 18D is a graph showing the strength of the magnetic field from the two permanent magnets 32u and 32d along the vertical direction in FIG. 18C. As can be understood from this graph as well, the direction of the magnetic field is reversed with upper coil portion 12u and the lower coil portion 12d. Therefore, if a current in the direction CD shown in FIGS. 18A and 18B flows to the electromagnetic coil 12, a driving force with the same direction DD is generated in the two permanent magnets 32u and 32d. It is preferable that the strength (in other words, the magnetic flux density) of the magnetic field in the upper coil portion 12u and the strength of the magnetic field in the lower coil portion 12d be equal. In order to accomplish this, it is preferable that magnets of the same dimension and the same characteristics be used as the two permanent magnets 32u and 32d, and that the distance from the electromagnetic coil 12 to the permanent magnets 32u and 32d also be the same.

With the configuration example in FIG. 18, it is possible to think that, while allowing electromagnetic interaction to be generated between the upper coil portion 12u and the first permanent magnet 32u, the second permanent magnet 32d functions as an element to prevent the generation of a driving force and prevents the generation of electromagnetic interaction between the lower coil portion 12d and the first permanent magnet 32u. However, electromagnetic interaction is generated even between the second permanent magnet 32d and the lower coil portion 12d. In other words, because a driving force is generated from both the upper coil portion 12u and the lower coil portion 12d, it is possible to obtain a large driving force.

Figure 19A:
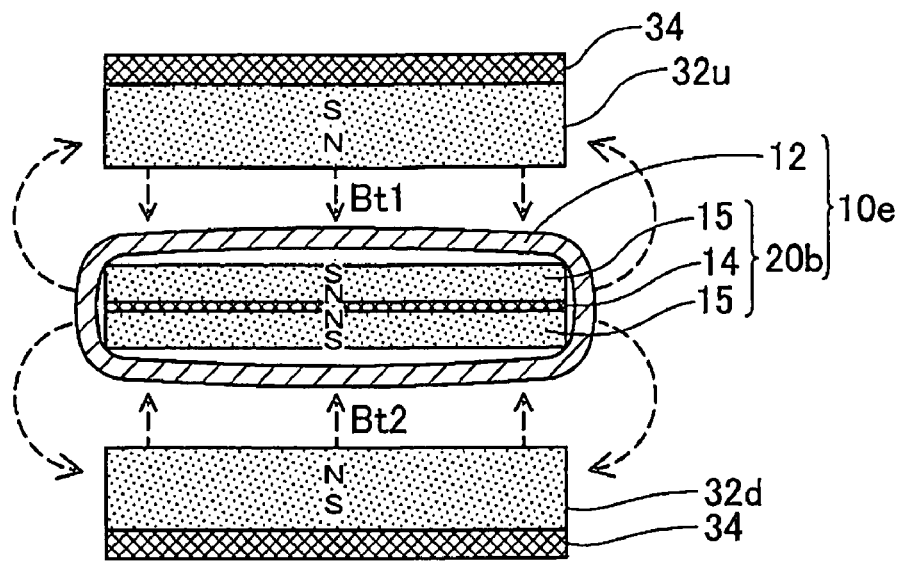
FIGS. 19A and 19B are explanatory drawings showing modified examples of the core member in the second configuration example shown in FIGS. 18A to 18D.
Figure 19B:
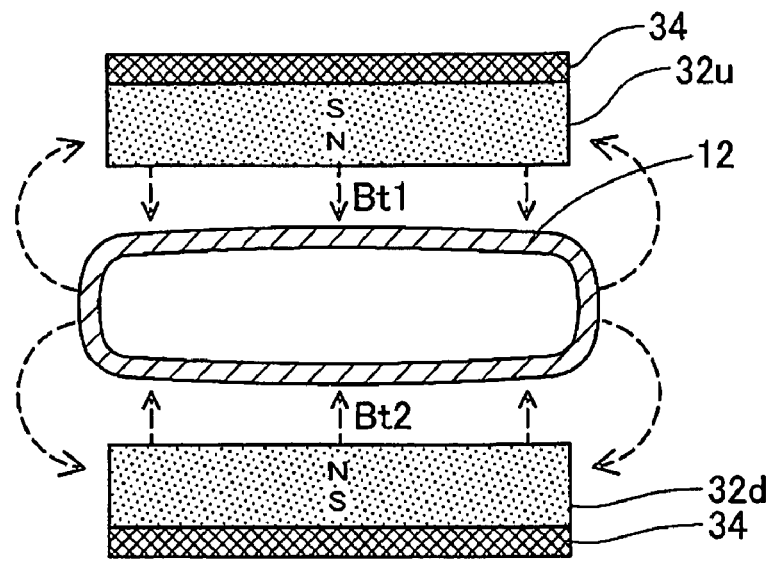

FIGS. 19A and 19B are explanatory drawings showing modified examples of the core member in the second configuration example of the second embodiment shown in FIGS. 18A to 18C. With the configuration in FIG. 19A, a magnet assembly is employed as the core element 20b with the core section 10e. This magnet assembly 20b is composed of one magnetic material member 14 and two permanent magnets 15 that are on both sides of the magnetic material member 14. The two permanent magnets 15 are each attracted to the magnetic material member 14 with the same poles mutually opposing. It is preferable that the main surface of the magnetic material member 14 (the surface that contacts the magnet) be larger than the main surface of the permanent magnet 15 (the surface that contacts the magnet member 14). In this configuration, the repellent force does not act upon the two magnets 15, and each magnet 15 is held in a state of attraction to magnetic material member 14. Therefore, it is possible to hold the two magnets 15a in a stable state such that the same poles of the two magnets 15 (the S pole in this example) are directed to opposite directions from the center of the magnet member 14 (the vertical direction in the drawing). With the configuration in FIG. 19B, the inner area of the magnetic coil 12 is hollow and has absolutely no core member. In this specification, a coil of this type of configuration is called a "hollow coil".

With the configurations in FIGS. 19A and 19B as well, the distribution of the magnetic field is almost exactly the same as that shown in FIG. 18D. Therefore, is possible to generate a driving force in the same drive direction DD from both upper coil portion 12u and lower coil portion 12d. As can be understood from this explanation as well, in a configuration where permanent magnets 32u and 32d are positioned on the top and bottom of the electromagnetic coil 12, it is also possible to configure the electromagnetic coil 12 as a hollow coil, or to configure it as a coil that has various core members with symmetrical construction in the vertical direction. However, because there is no excessive force at work between the core and the permanent magnets 32u and 32d when it is made a hollow coil or is configured with a core member of a non-magnetic material, it offers the merit of being able to realize a smoother drive.

Figure 20A:
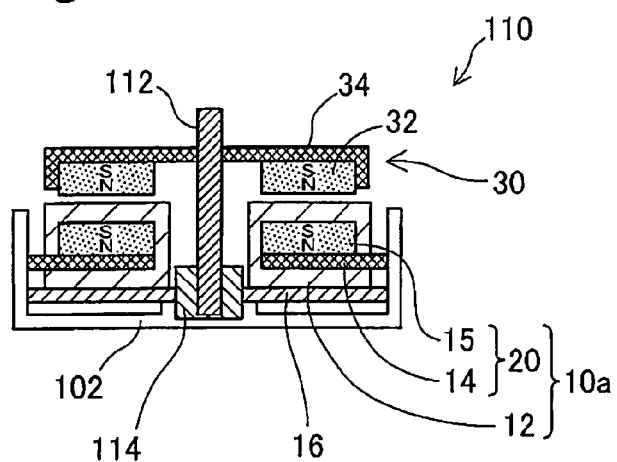
FIGS. 20A to 20C are cross-sectional drawings showing the configuration of the rotary motor as the first example of the second embodiment.
Figure 20B:
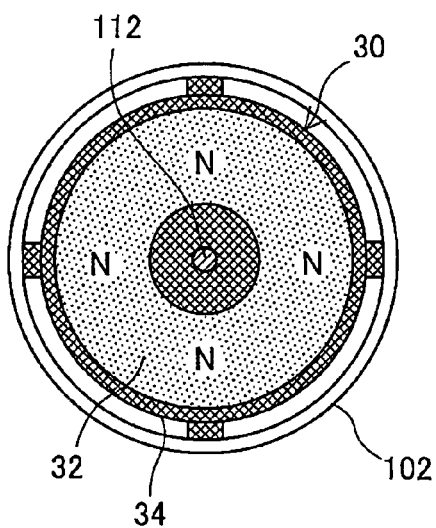
Figure 20C:
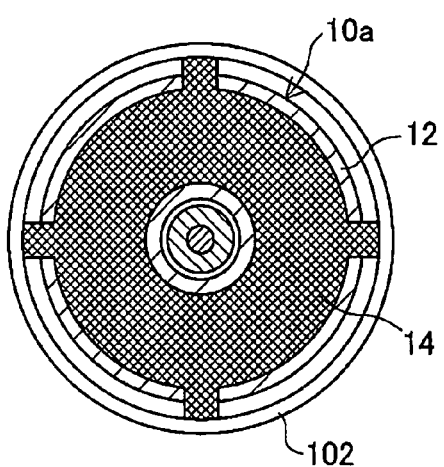

FIGS. 20A to 20C are cross-sectional drawings showing the configuration of the rotary brushless motor as the first example of the second embodiment. This motor 110 has a stator including a coil section 10*a*, and a rotor section 30 including a permanent magnet 32. The configuration of the coil section 10*a* and the permanent magnet 32 is that shown in FIGS. 16A to 16C. As shown in FIG. 20B, the rotor section 30 contains a plate-like permanent magnet 32 with a ring shape. The center of the rotor section 30 is fixed to a rotating axis 112. The rotating axis 112 is held by a bearing section 114. A magnetic yoke member 34 is installed over the permanent magnet 32. The magnetic yoke member 34 may be omitted. FIG. 20C shows a cross section of the stator, which contains the coil section 10*a*; it is a cross section at the position of magnetic material member 14. The magnetic material member 14 is a plate-like member with a roughly ring shape having four protrusions in order to connect with the casing 102. These protrusions, however, may be omitted. The electromagnetic coil 12 passes through the center of the magnetic material member 14 and is wound around the magnetic material member 14. The electromagnetic coil 12 can, for example, be formed by a flat coil wound with a long, thin, sheet conducting wire, but it is simplified in each drawing of this specification. As shown in FIG. 20A, the electromagnetic coil 12 is set on a substrate (circuit board) 16. The stator, which is composed of a coil section 10*a* and substrate 16, is fixed to the casing 102 of the motor 110.

Figure 21A:
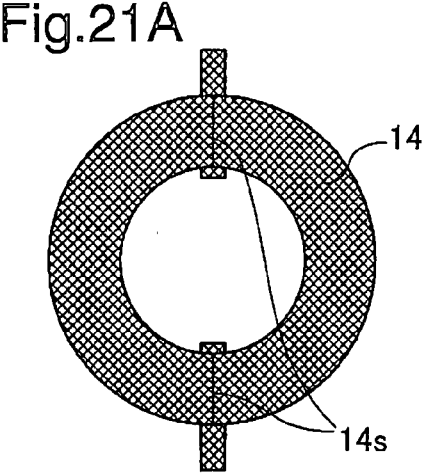
FIGS. 21A to 21F show concrete examples of the shape of the coil section.
Figure 21B:
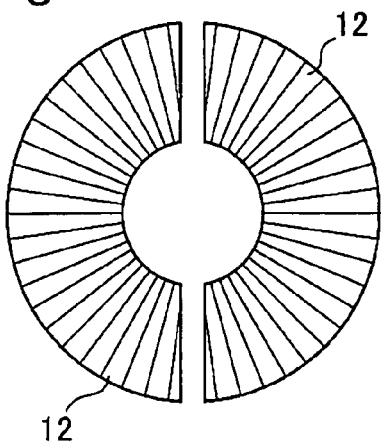
Figure 21C:
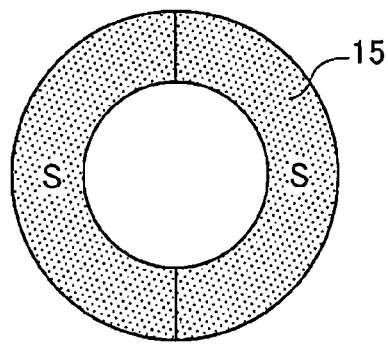
Figure 21D:
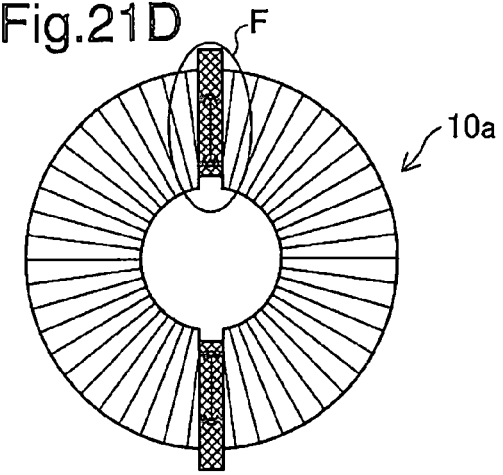
Figure 21E:
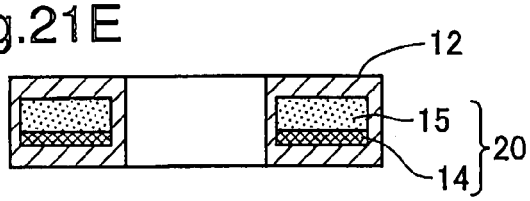
Figure 21F:
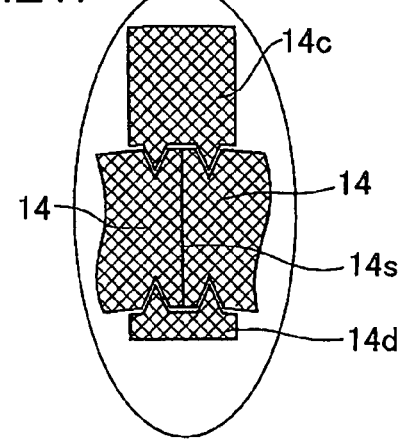
Figure 22A:
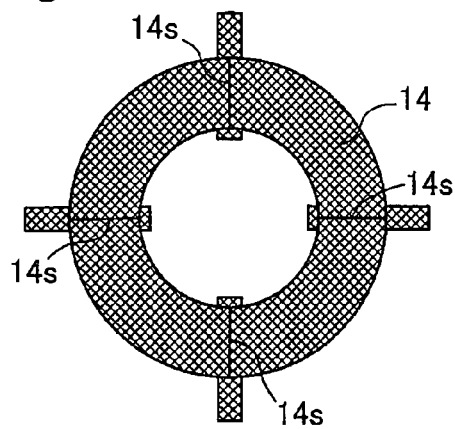
FIGS. 22A to 22F show examples of the other shapes of the coil section.
Figure 22B:
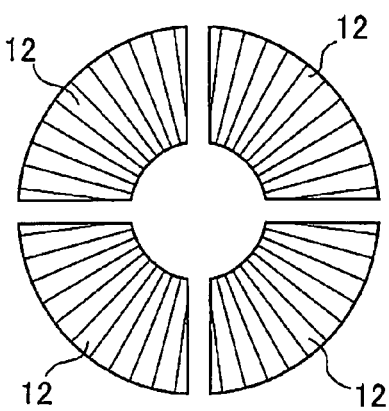
Figure 22C:
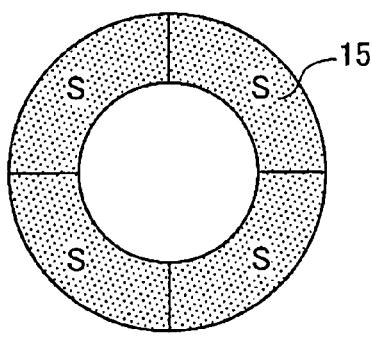
Figure 22D:
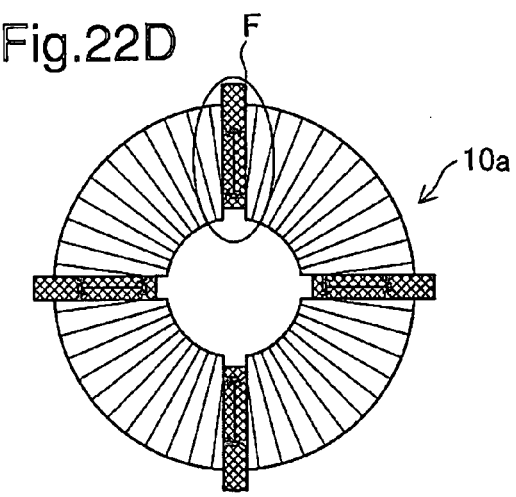
Figure 22E:
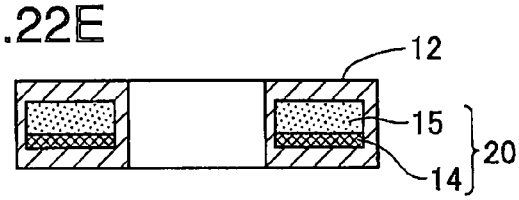
Figure 22F:
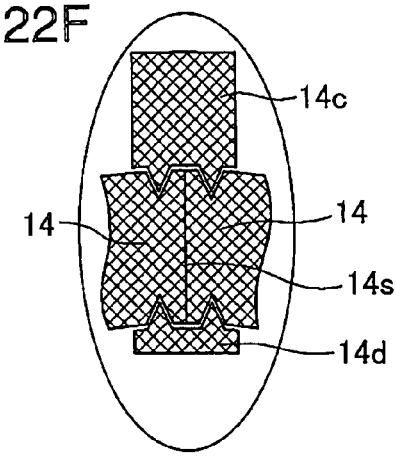

FIGS. 21A to 21F show concrete examples of the shape of the coil section 10*a*. As indicated in FIGS. 21A, 21B and 21C, the magnetic material member 14, the electromagnetic coil 12, and the permanent magnet 15 are each composed of two elements with a half-ring shape. The boundary of the half-ring members that comprise the magnetic material member 14 has a divider section 14*s*. FIG. 21D is a top view showing the combined form of the magnetic material member 14 and the electromagnetic coil 12, and FIG. 21E is a cross-sectional drawing of that. The permanent magnet 25 is omitted from FIG. 21D for the sake of simplicity. As shown in FIG. 21E, the half-ring shaped magnetic material member 14 and the permanent magnet 15 are each inserted into the space or hole in the half-ring electromagnetic coil 12 and are then mutually coupled as shown in FIG. 21D. FIG. 21F shows an enlarged view of the area marked as F in FIG. 21D. Here, wedge-shaped connecting members 14*c* and 14*d* are inserted into the top and bottom of the divider section 14*s*, and through these, the half-ring magnetic members 14 are mutually connected.

FIGS. 22A to 22F show examples of shapes when the magnetic material member 14 and the electromagnetic coil 12 are each divided into fourths. As can be understood by these examples, it is possible to realize not only a motor that uses a straight plate-type permanent magnet and electromagnetic yoke member like that shown in FIGS. 16A to 16C and FIGS. 18A to 18C, but also a motor that uses a curved permanent magnet and electromagnetic yoke member.

In this way, with the brushless motor of the first example of the second embodiment, the coil section 10*a* is installed in a position opposing the first permanent magnet 32, and a second permanent magnet 15 is installed as a member of the core 20 of the coil section 10*a* such that different poles of these two magnet 32, 15 are mutually opposing. Accordingly, it is possible to generate a force to the motor in a given drive direction by applying a one-directional current flow to the electromagnetic coil 12. In other words, the brushless motor of the present example can be operated without having to use a control circuit to switch the direction of the drive voltage or drive current.

Figure 23A:
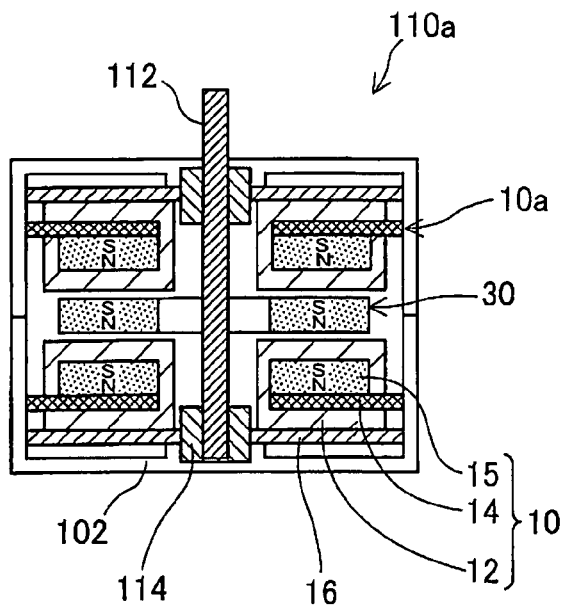
FIGS. 23A to 23C are cross-sectional drawings showing the configuration of the rotary motor in the second example of the second embodiment.
Figure 23B:
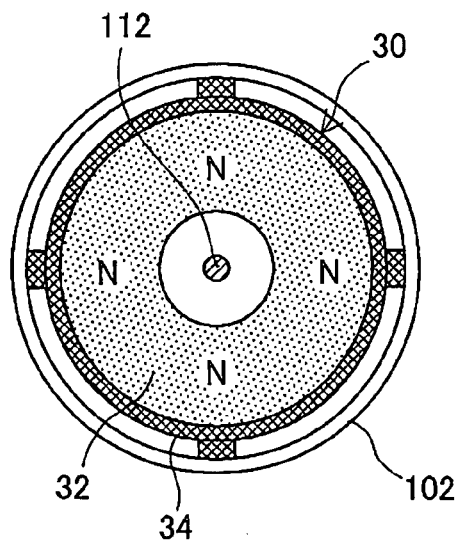
Figure 23C:
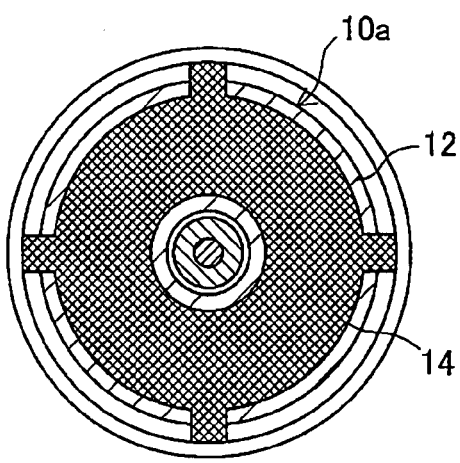

FIGS. 23A to 23C show the configuration of the rotary brushless motor in the second example of the second embodiment. This motor 110*a* has a stators including the coil sections 10*a*, which are installed on both the top and bottom of the rotor 30 of the motor in the first example shown in FIG. 20A, while other points are the same as the first example shown in FIGS. 20A to 20C. The motor in this second example can generate a driving force of approximately twice that of the motor in the first example.

Figure 24A:
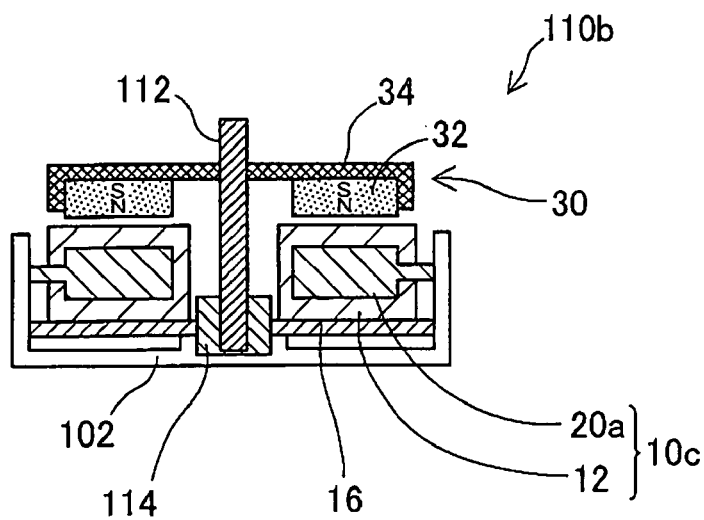
FIGS. 24A to 24C are cross-sectional drawings showing the configuration of the rotary motor in the third example of the second embodiment.
Figure 24B:
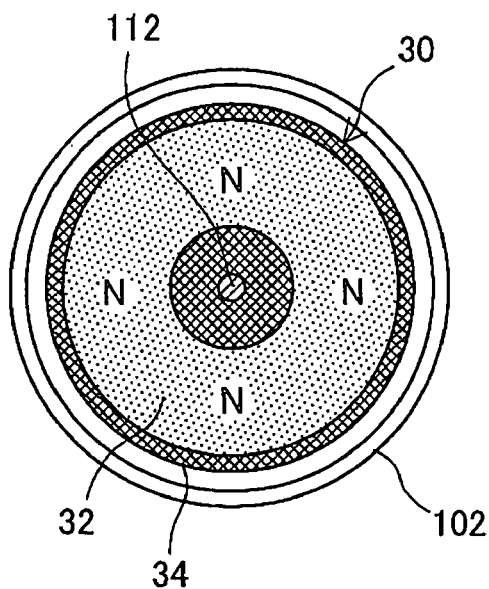
Figure 24C:
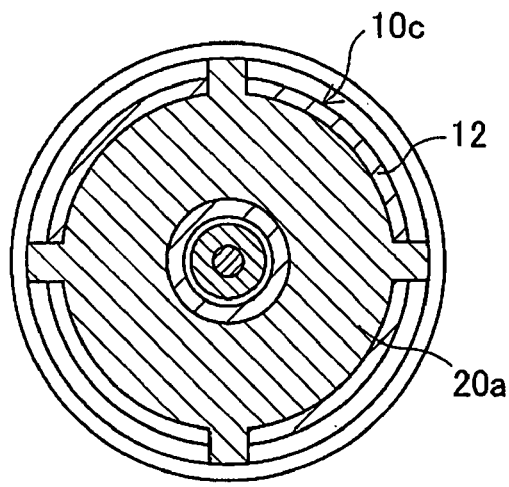

FIGS. 24A to 24C illustrate the configuration of the rotary brushless motor in the third example of the second embodiment. This motor 110*b* replaces the coil section 10*a* of the motor in the first example shown in FIGS. 20A to 20C with the coil section 10*c* shown in FIG. 17B. While the motor in this third example has a slightly weaker driving force than the motor in the first example, it is lighter in weight.

Figure 25A:
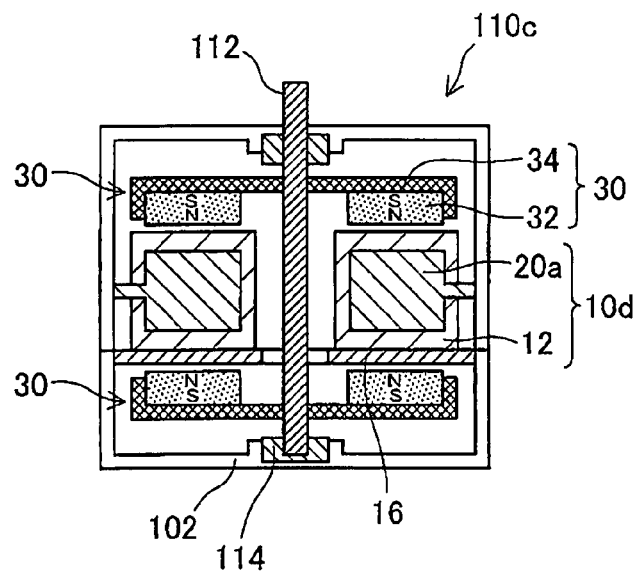
FIGS. 25A to 25C are cross-sectional drawings showing the configuration of the rotary motor in the fourth example of the second embodiment.
Figure 25B:
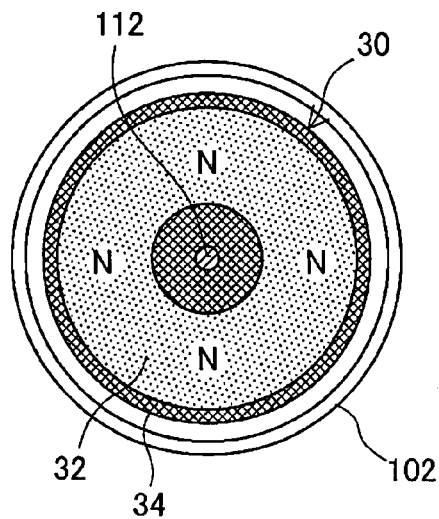
Figure 25C:
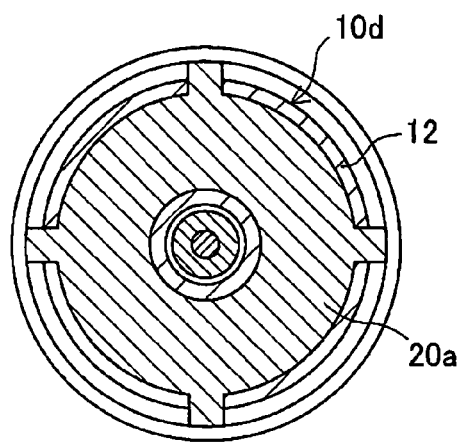

FIGS. 25A to 25C show the configuration of the rotary brushless motor in the fourth example of the second embodiment. This motor 110*c* is composed of rotor sections 30 that are respectively installed on the upper side and lower side of the stator including a coil section 10*d*. The coil section 10*d* and the permanent magnet 32 have the configuration shown in FIGS. 18A to 18C. With this motor, it is possible to generate a valid driving force from both the coil portion on the top and the coil portion on the bottom of the core member 20*a*. It is, therefore, possible to improve efficiency even more than in the first example shown in FIGS. 20A to 20C and the second example shown in FIGS. 23A to 23C.

Figure 26A:
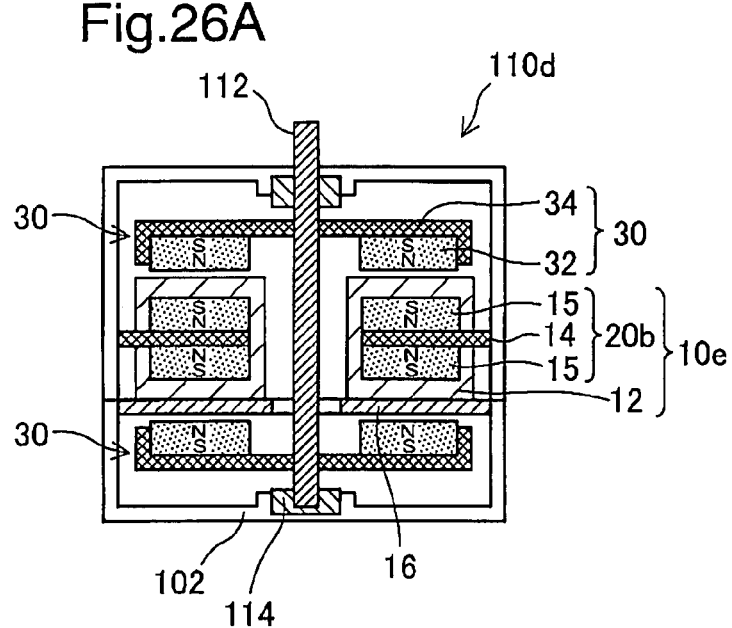
FIGS. 26A to 26C are cross-sectional drawings showing the configuration of the rotary motor in the fifth example of the second embodiment.
Figure 26B:
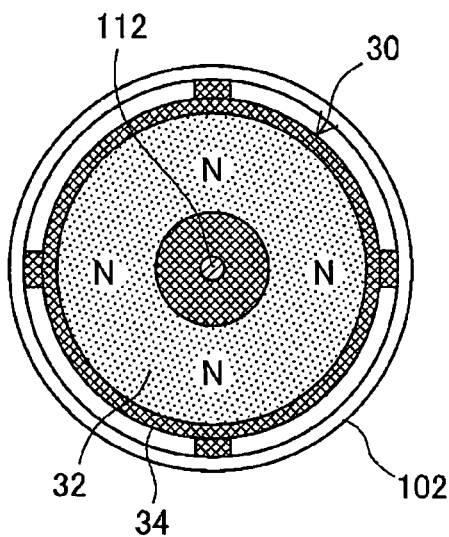
Figure 26C:
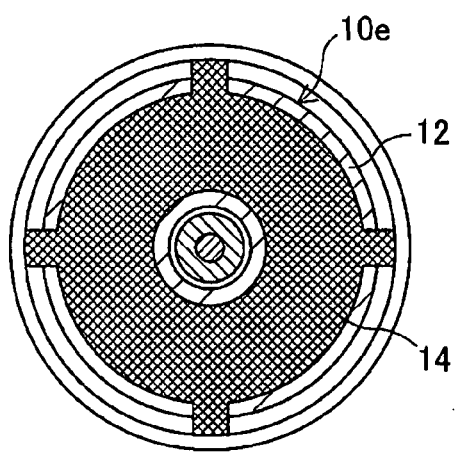

FIGS. 26A to 26C show the configuration of the rotary brushless motor in the fifth example of the second embodiment. This motor 110*d* is composed of rotor sections 30 that are respectively installed on the upper side and lower side of the stator including a coil section 10*e*. The coil section 10*e* and the permanent magnet 32 have the configuration shown in FIG. 19A. With this motor, it is possible to generate a valid driving force from both the coil portion on the top and the coil portion on the bottom of the core member 20*b*. It is, therefore, possible to improve efficiency even more than in the first example shown in FIGS. 20A to 20C and the second example shown in FIGS. 23A to 23C.

Figure 27:
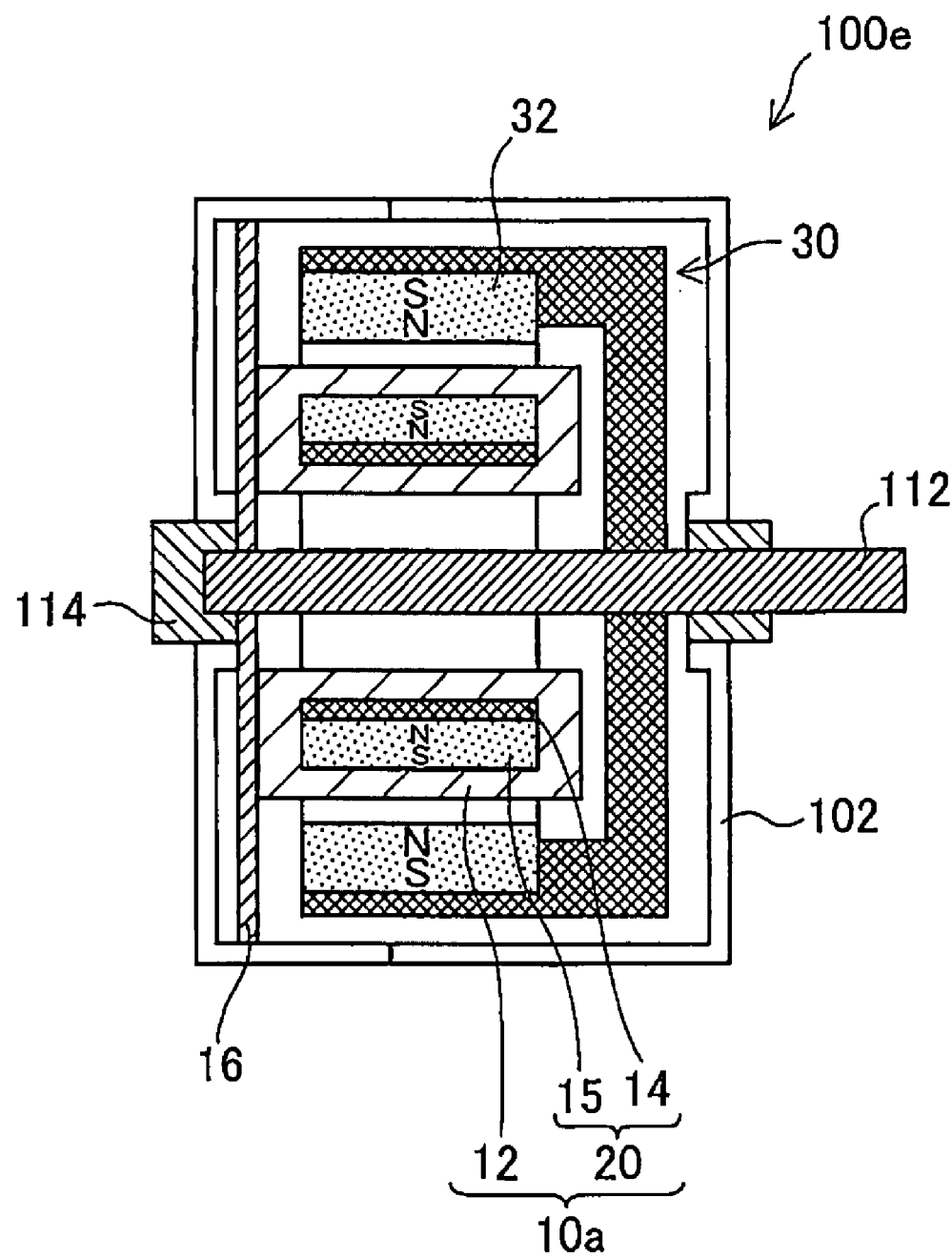
FIG. 27 is a cross-sectional drawing showing the configuration of the rotary motor in the sixth example of the second embodiment.

FIG. 27 shows the configuration of the rotary brushless motor in the sixth example of the second embodiment. This motor 110*e* is composed such that the rotor section 30 including a hollow cylindrical permanent magnet 32, and the stator including a coil section 10*a* form concentric cylinders around a rotating axis 112. The coil section 10*a* and permanent magnet 32 have the configuration shown in FIGS. 16A to 16C. This kind of motor can also generate a valid driving force in line with the principal explained in FIGS. 16A to 16C.

Figure 28:
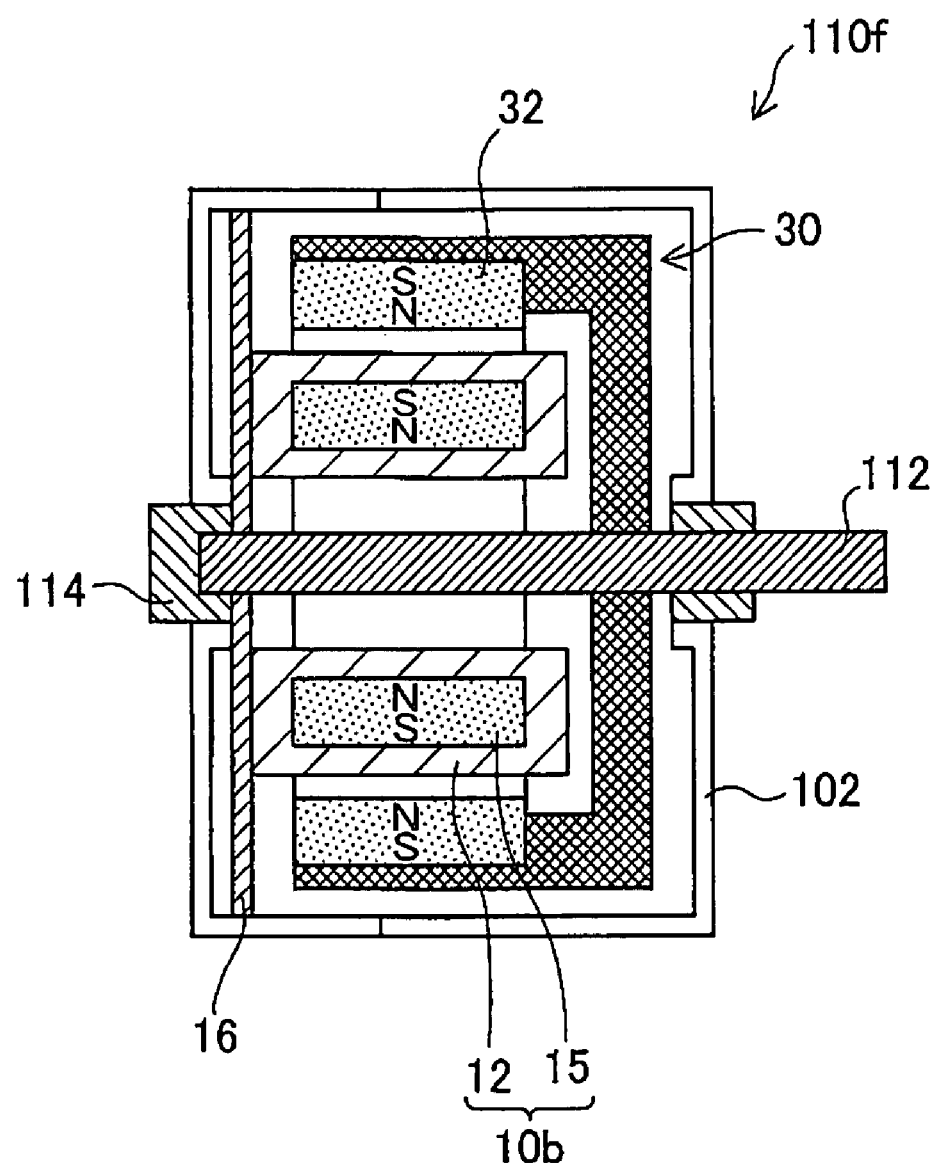
FIG. 28 is a cross-sectional drawing showing the configuration of the rotary motor in the seventh example of the second embodiment.

FIG. 28 shows the configuration of the rotary brushless motor in the seventh example of the second embodiment. This motor 110*f* omits the magnetic material member 14 from the core member of the motor shown in FIG. 27. The configuration of coil section 10*b* is the same as shown in FIG. 17A. This motor 110*f* has almost the same effect as that shown in FIG. 27.

Figure 29:
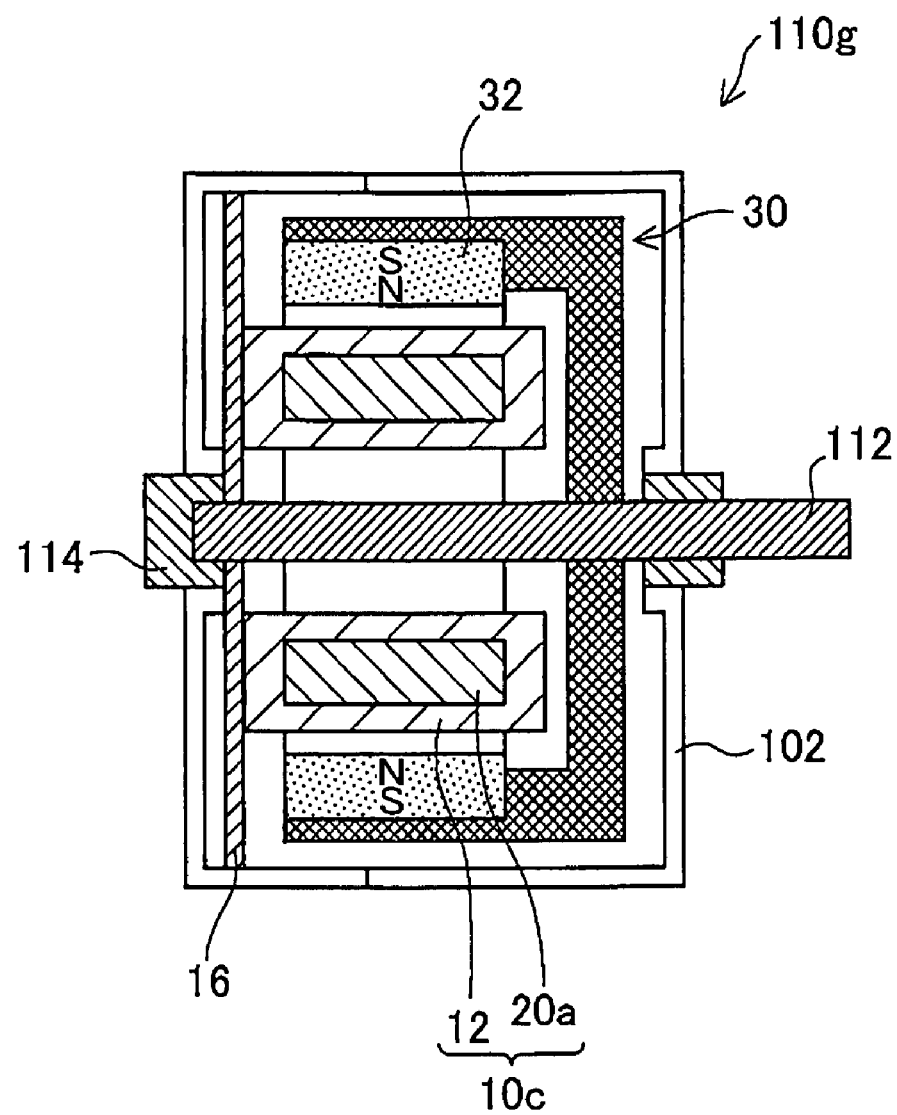
FIG. 29 is a cross-sectional drawing showing the configuration of the rotary motor in the eighth example of the second embodiment.

FIG. 29 shows the configuration of the rotary brushless motor in the eighth example of the second embodiment. This motor 110*g* substitutes the permanent magnet 15 in the motor's core shown in FIG. 28 with a non-magnetic member 20*a*. The configuration of the coil section 10*c* is the same as in FIG. 17B. With this motor 110*g*, because a negative driving force (a driving force in the direction opposite to the motor drive direction) is generated from the coil portion located on the opposite side of the permanent magnet 32, the net driving force decreases. But this makes it possible to obtain a lighter motor.

Figure 30:
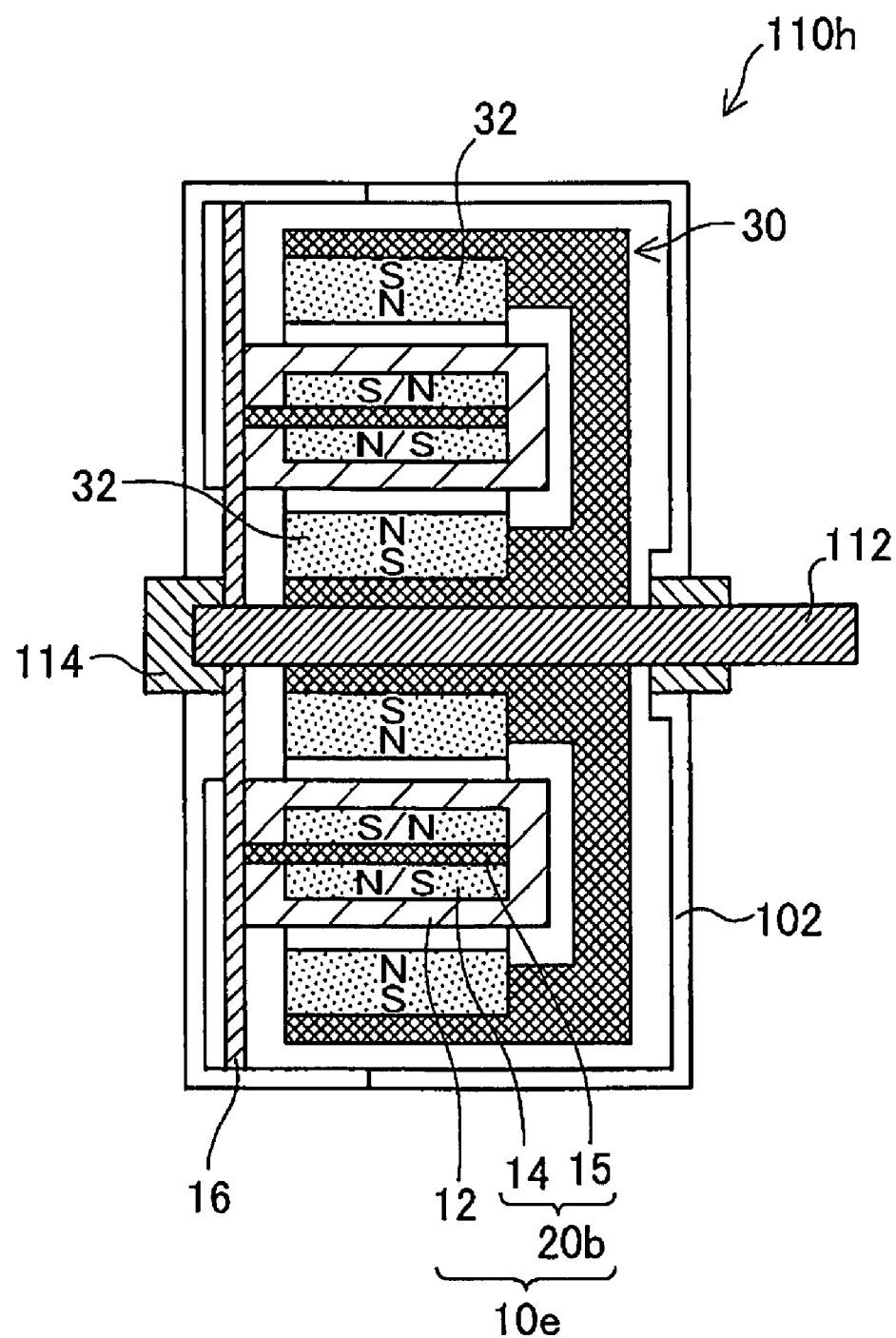
FIG. 30 is a cross-sectional drawing showing the configuration of the rotary motor in the ninth example of the second embodiment.

FIG. 30 shows the configuration of the rotary brushless motor in the ninth example of the second embodiment. This motor 110h replaces the rotor section 30 of the eighth example shown in FIG. 29 with a dual-layered cylindrical rotor, which includes additional permanent magnets 32 at its inner side of the stator. The configuration of the coil section 10e is the same as shown in FIG. 19A. It is possible to generate a valid driving force from both sides of the coil with this configuration, and to achieve an efficient motor.

Figures 31A, 31B:
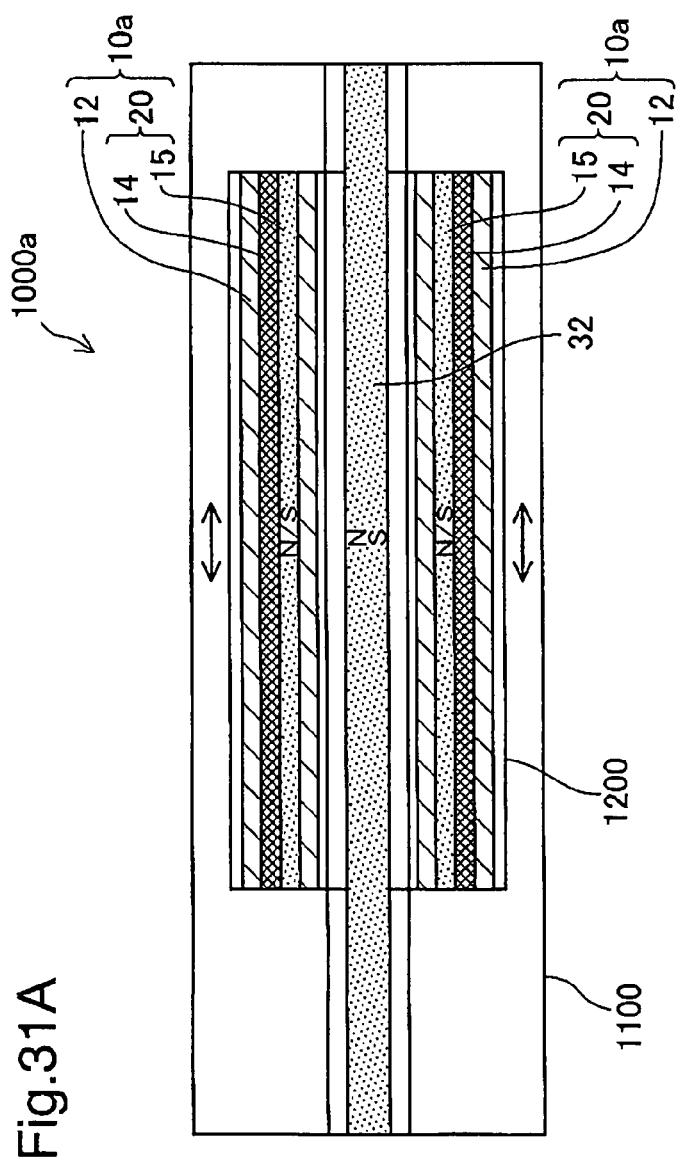
FIGS. 31A and 31B are cross-sectional drawings showing the configuration of the linear motor in the tenth example of the second embodiment.

FIGS. 31A and 31B show the configuration of the linear motor in the tenth example of the second embodiment. This linear motor 1000a is equipped with a fixed guide section 1100 and a moving section 1200. As shown in FIG. 31A, a plate-like permanent magnet 32 that extends in the moving direction is installed at the center of fixed guide section 1100. The moving section 1200 is configured to be on both sides of the fixed guide section 1100 in the vertical directions, and has coil sections 10a installed in opposing positions, both above and below the permanent magnet 32. The coil sections 10a and permanent magnet 32 have the configuration shown in FIGS. 16A to 16C. As shown in FIG. 31B, moving section 1200 is equipped with a drive controller 1250. The drive controller 1250 includes a self-contained power supply (omitted in the drawing), such as a fuel cell, etc. The fixed guide section 1100 is equipped with a rail 1120 that guides the moving section 1200. The moving section 1200 is held in the rail 1120 in a slidable state by the bearing section 1140. This type of linear motor is also a feasible embodiment of the brushless motor of the present invention.

Figure 32B:
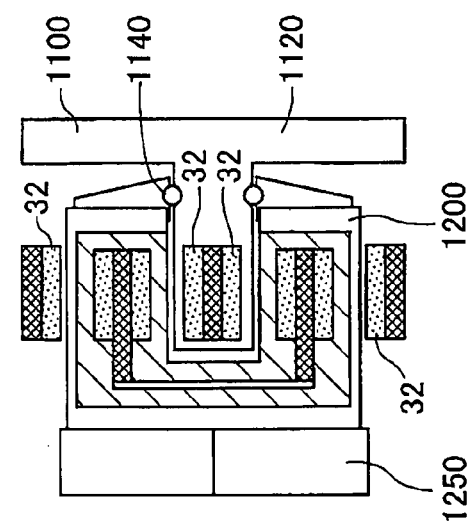
FIGS. 32A and 32B are cross-sectional drawings showing the configuration of the linear motor in the eleventh example of the second embodiment.
Figure 32A:
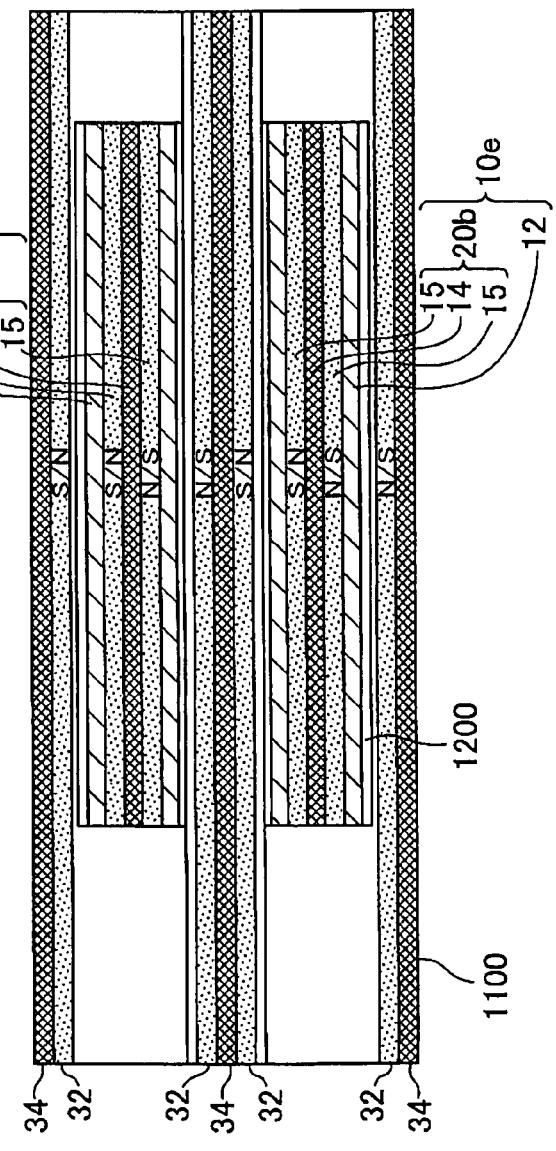

FIGS. 32A and 32B show the configuration of the linear motor in the eleventh example of the second embodiment. The configuration of the fixed guide section 1100 on this linear motor 1010a differs from that of the tenth example shown in FIGS. 31A and 31B. Specifically, in this eleventh example, two permanent magnets 32 are installed on both sides of the magnetic yoke member 34 at the center of the fixed guide section 1100. The magnetized direction of these two magnets 32 may be the same or they may be opposite. Permanent magnets 32 and magnetic yoke members 34 are also installed on the outside of the moving sections 1200 that are on both sides of the fixed guide section 1100. The coil sections 10e and permanent magnets 32 have the configuration shown in FIG. 19A. In the eleventh example, by employing multiple permanent magnets 32, it is possible to effectively utilize each of the coil portions (the upper coil portion 12u and lower coil portion 12d explained in FIG. 18A) on the top and bottom of the two coil sections 10e.

Figure 33B:
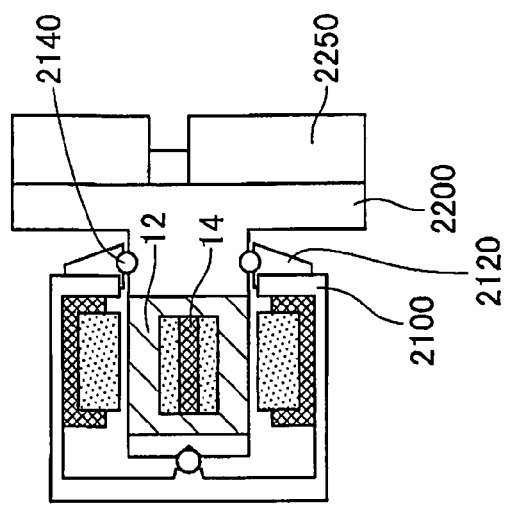
FIGS. 33A and 33B are cross-sectional drawings showing the configuration of the linear motor in the twelfth example of the second embodiment.
Figure 33A:
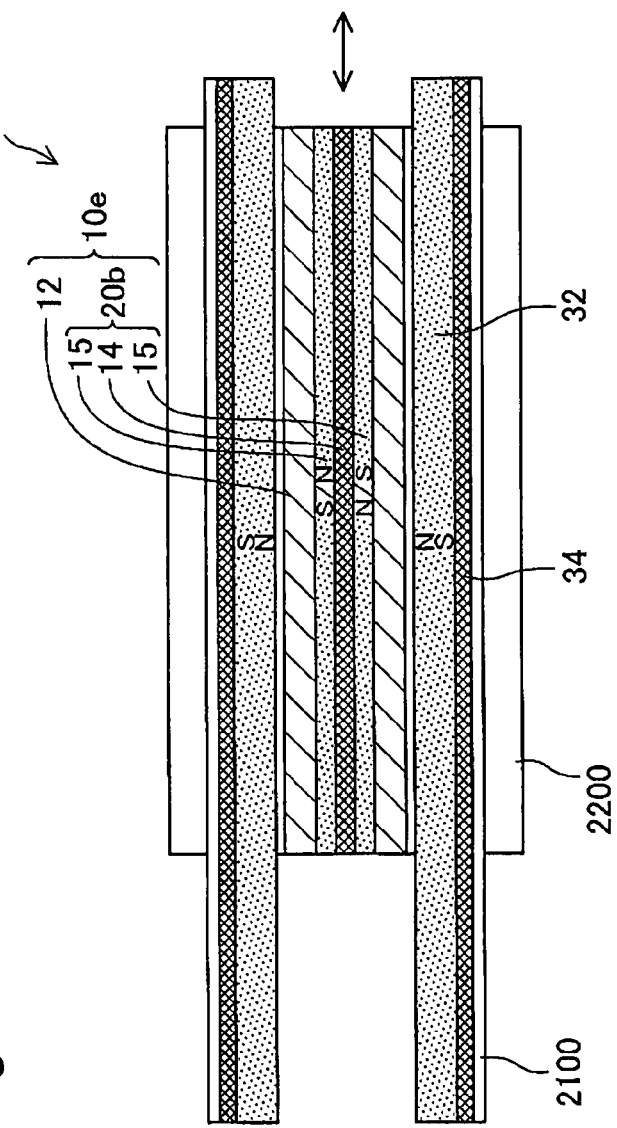

FIGS. 33A and 33B show the configuration of the linear motor in the twelfth example of the second embodiment. This linear motor 2000a is equipped with a fixed guide section 2100 and a moving section 2200. As shown in FIG. 33A, a coil section 10e that extends in the moving direction is installed at the center of the fixed guide section 2200. This coil section 10e is the same as that shown in FIG. 19A. The fixed guide section 2100 is configured to be on both sides of the moving section 2200 in the vertical directions, and two permanent magnets 32 are installed in opposing positions. As shown in FIG. 33B, the moving section 2200 is equipped with a drive controller 2250. The drive controller 2250 includes a self-contained power supply (omitted in the drawing), such as a fuel cell, etc. The fixed guide section 2100 is equipped with a rail 2120 that guides the moving section 2200. The moving section 2200 is held in the rail 2120 in a slidable state by the bearing section 2140. This linear motor uses permanent magnets in the fixed guide section and an electromagnetic coil in the moving section; this relationship is switched from that of the tenth example shown in FIGS. 31A and 31B. As can be understood from the various examples noted above, the brushless motor in the second embodiment of the present invention can be realized with various mechanical structures by employing the configurations for the coil section shown in FIGS. 16A-16C, 17A-17B, 18A-18C, and 19A-19B, as well as configurations similar to that.

As can be understood from the various examples noted above, the brushless motor of the various examples of the second embodiment of the present invention can take various different configurations, such as being composed of a first member (also called the "first driven member") equipped with a first permanent magnet, a second member (also called the "second driven member") equipped with an electromagnetic coil, or such that the first and second driven members are capable of relative movement. In the case of a rotary motor, the first driven member may, for example, be a rotor and the second driven member a stator.

C. Modification Examples

It is further understood by those skilled in the art that the foregoing description refers to preferred embodiments and examples of the disclosed invention and that various changes and modifications such as the following examples may be made in the invention without departing from the spirit and scope thereof.

C1. Modification Example 1

Figure 34A:
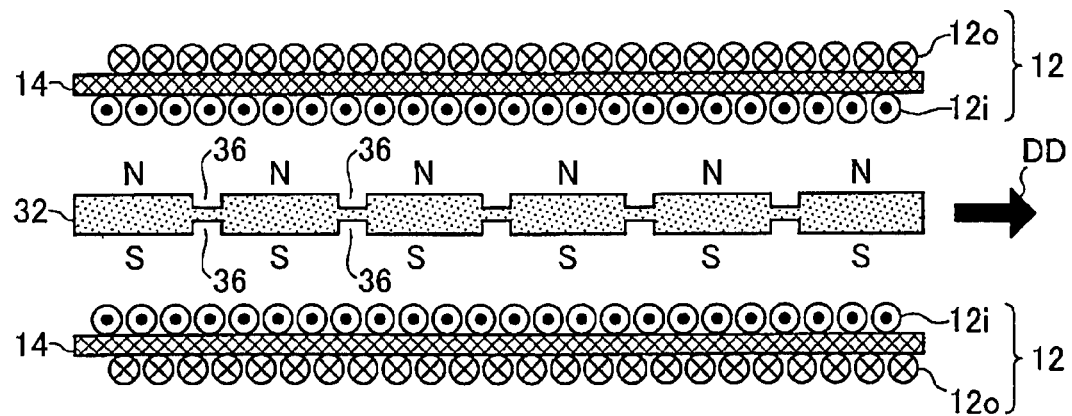
FIGS. 34A and 34B are explanatory drawings showing modified examples of the configuration shown in FIG. 1B.
Figure 34B:
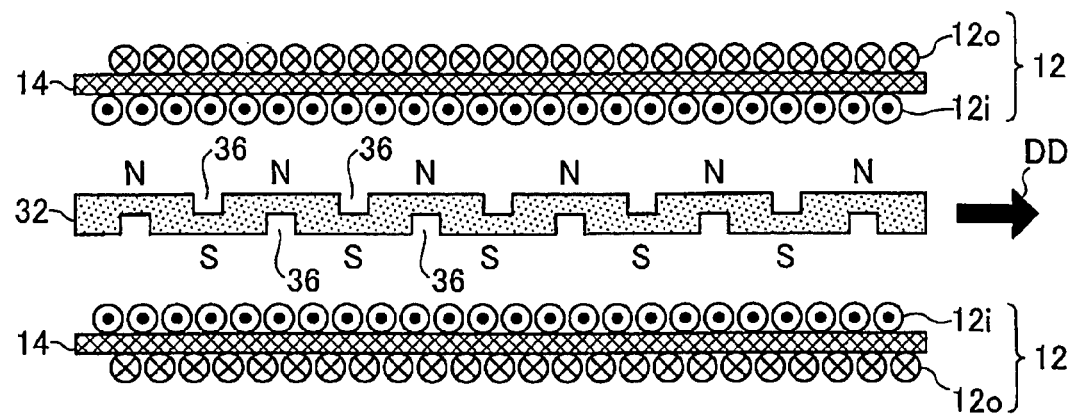

FIGS. 34A and 34B are explanatory drawings showing modified examples of the configuration shown in FIG. 1B. In the example shown in FIG. 34A, slits 36 are arranged in opposing positions on the top surface and bottom surface of the magnet 32. In the example in FIG. 34B, the slits 36 arranged on the top surface of the magnet 32 and the slits 36 on the bottom surface are arranged in positions such that each slit is shifted by half the pitch of the adjacent slits.

Figure 35A:
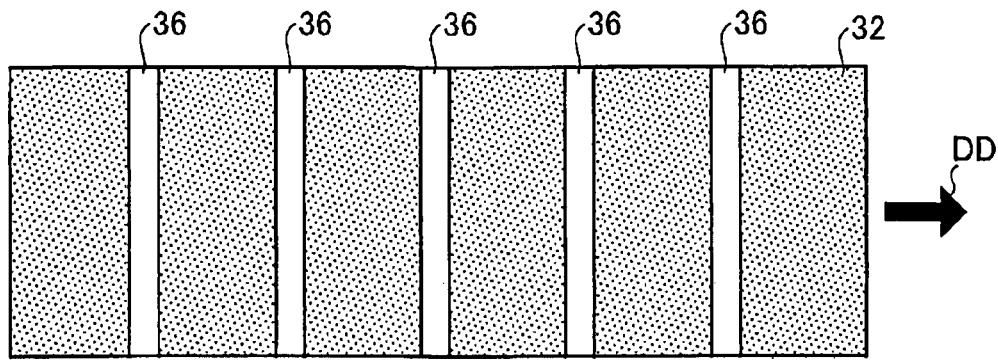
FIGS. 35A to 35C are explanatory drawings showing examples of the positioning of the slits on a magnet.
Figure 35B:
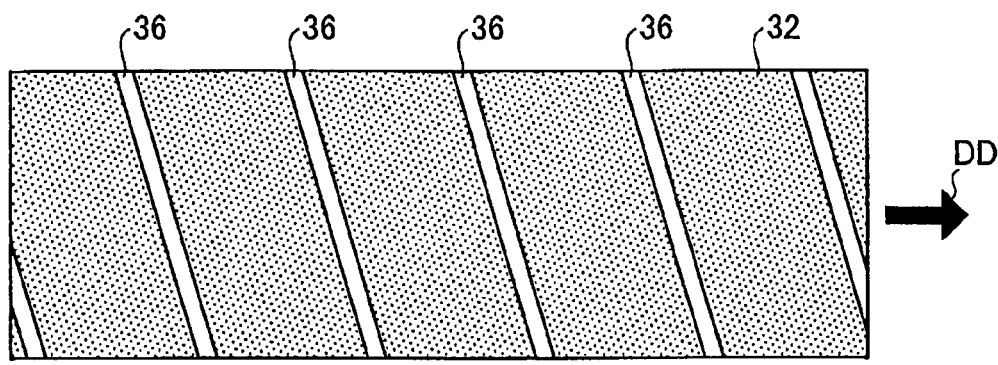
Figure 35C:
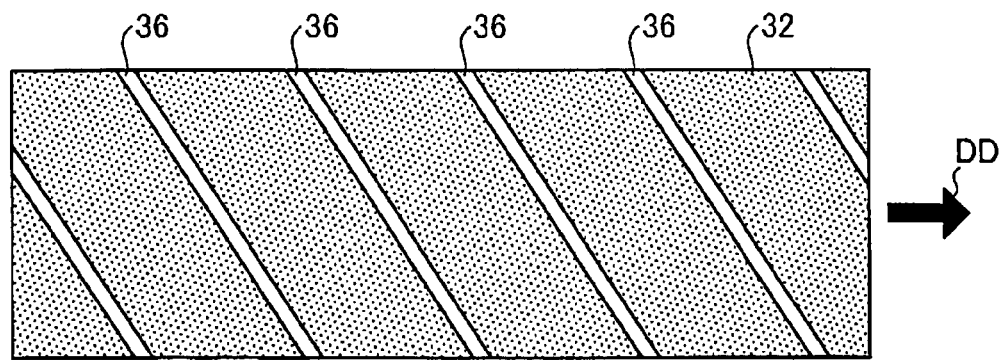

FIGS. 35A to 35C are explanatory drawings showing examples of the positioning of the slits 36 on a magnet 32. In the example in FIG. 35A, the slits 36 are arranged along a direction that is orthogonal to the drive direction DD. In the examples shown in FIGS. 35B and 35C, the slits 36 are arranged along an oblique direction with respect to both the drive direction DD and the orthogonal to the drive direction DD. As we can see from these examples, the slits 36 may preferably be arranged along a direction that intersects with the motor's drive direction DD. The reason for this is as follows. It is generally known that infinite plate magnets that are magnetized in the direction of thickness have a magnetic flux density equal to 0. The same phenomenon arises with sufficiently large plate magnets. Here, by arranging the slits 36 of the plate magnet surface on a permanent magnet 32, the magnetic flux density can be increased and, as a result, it becomes possible to increase the driving force.

Figure 36A:
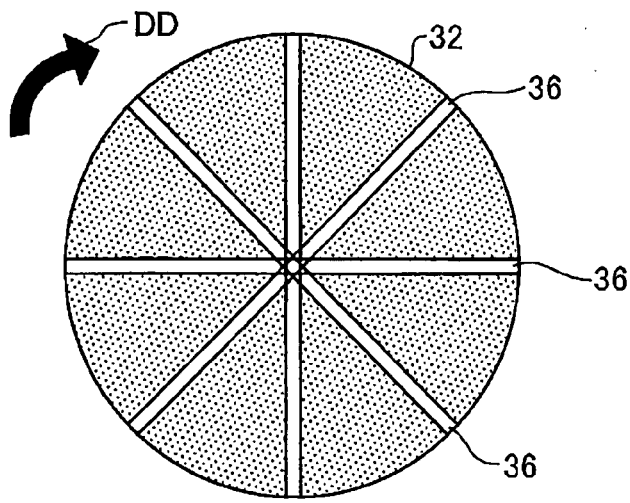
FIGS. 36A to 36C are explanatory drawings showing examples of the positioning of the slits on a ring magnet.
Figure 36B:
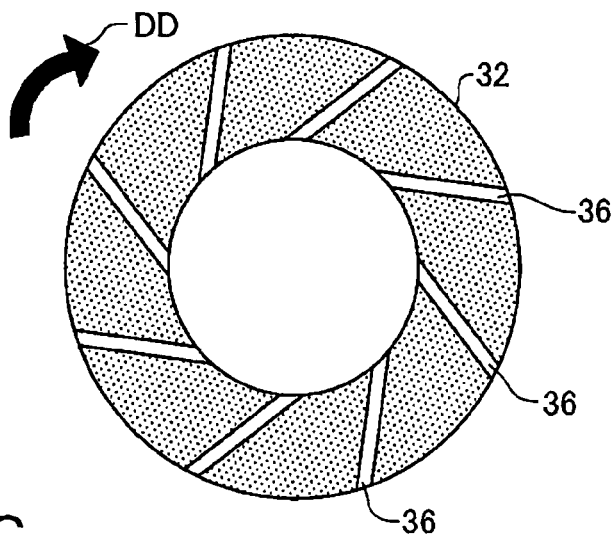
Figure 36C:
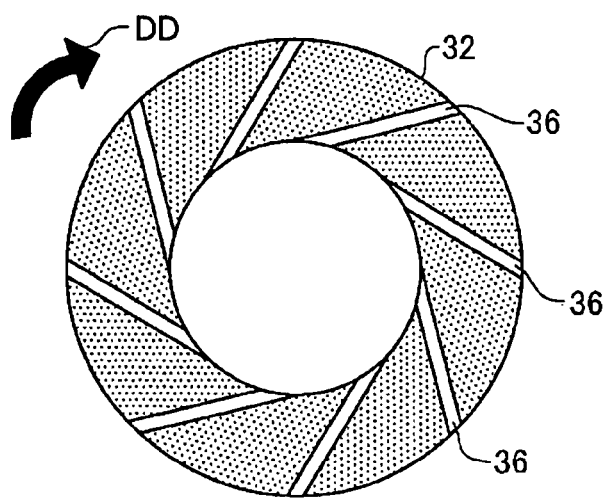

FIGS. 36A to 36C are explanatory drawings showing examples of the positioning of the slits 36 on a ring magnet. Ring magnets are used in disk-like rotary motors, such as shown in FIGS. 3A to 3C. In FIG. 36A, the slits 36 are arranged along a direction that intersects with the drive direction DD. In FIGS. 36B and 36C, the slits 36 are arranged along an oblique direction with respect to both the drive direction DD and the orthogonal to the drive direction DD.

Figure 37A:
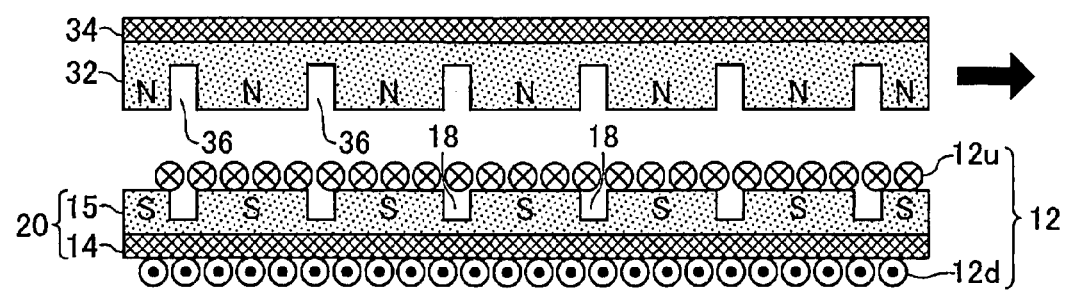
FIGS. 37A and 37B are explanatory drawings showing modified examples of the configuration shown in FIG. 16B.
Figure 37B:
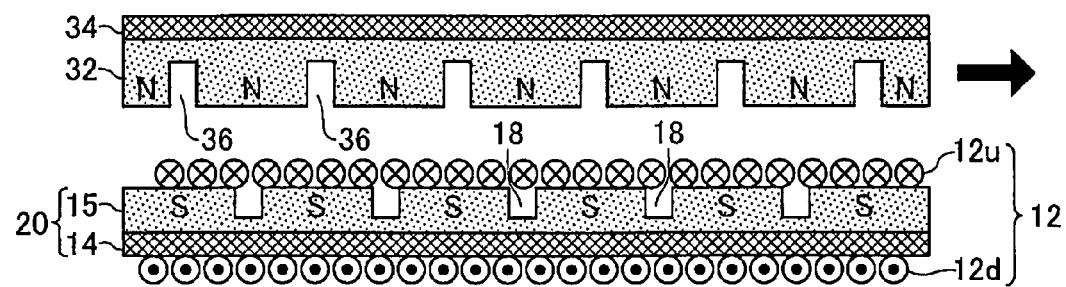

FIGS. 37A and 37B are explanatory drawings showing modified examples of the configuration shown in FIG. 16B. In these examples, slits 36 are arranged on the surface of the permanent magnet 32. Furthermore, in these examples, slits 18 are also arranged on the surface of the permanent magnet at that forms the core member 20. These two types of slits, 36 and 18, may be arranged in opposing positions, such as shown in FIG. 37A, or, may be arranged with a mutual shift of only ½ of a slit pitch, such as shown in FIG. 37B.

Figure 38A:
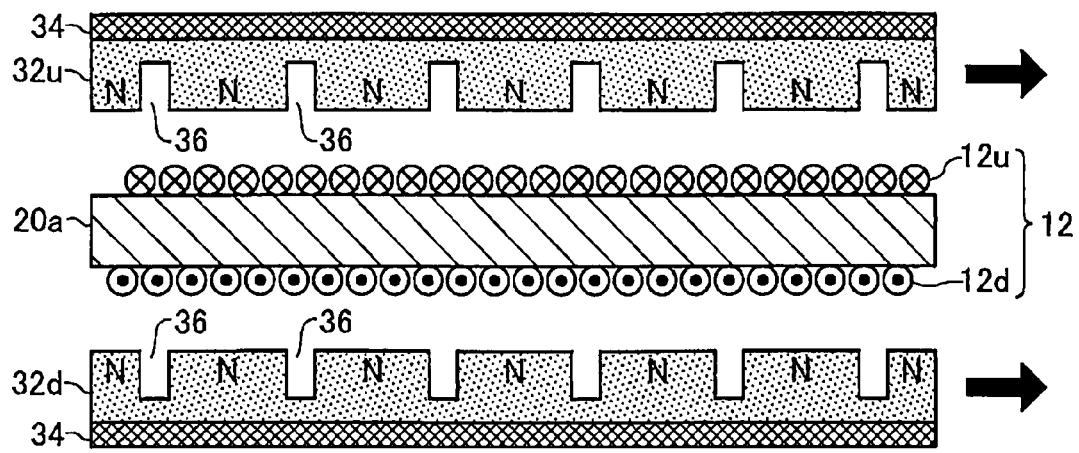
FIGS. 38A and 38B are explanatory drawings showing modified examples of the configuration shown in FIG. 18B.
Figure 38B:
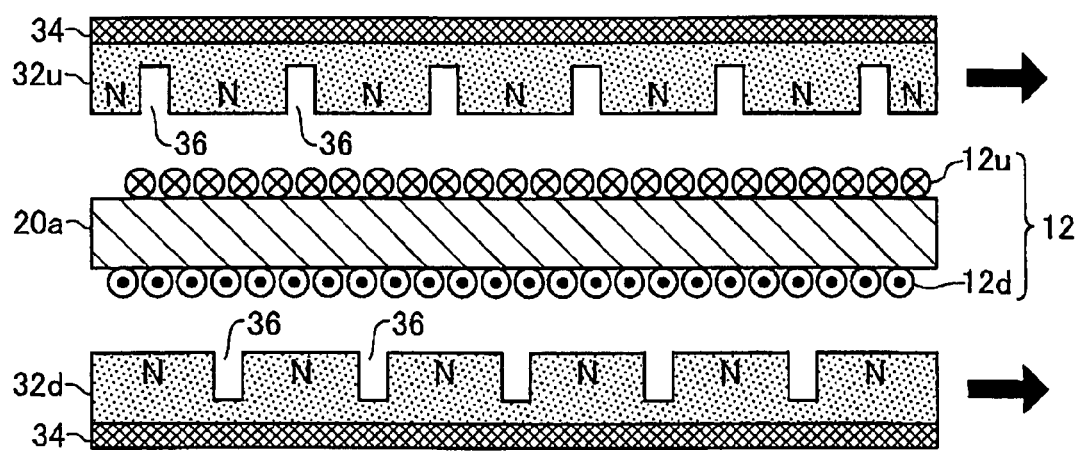

FIGS. 38A and 38B are explanatory drawings showing modified examples of the configuration shown in FIG. 18B. In these examples as well, slits 36 are arranged on the surface of the permanent magnets 32u, 32d. The slits 36 on the first permanent magnet 32u and the slits 36 on the second permanent magnet 32d may be arranged in either opposing or shifted positions.

In the modified examples shown in FIGS. 34A-34B, 35A-35C, 26A-36C, 37A-37, and 38A-38B, while slits are arranged on permanent magnets, the permanent magnets may be separated at the slit positions. In such a case, multiple small permanent magnets are understandably arranged with a space between them. In this case, the gaps and slits of FIGS. 34A-34B, 35A-35C, 26A-36C, 37A-37, and 38A-38B may be thought to be "recesses" arranged in the permanent magnets. In addition, an almost equivalent effect may be achieved even if protrusion are arranged on the permanent magnet instead of the recesses. Permanent magnets having recesses or protrusions arranged along a direction that intersects with the drive direction may be created according to various methods. For example, an unmagnetized ferromagnetic member that has the same shape as the final magnet is provided and, by magnetizing this ferromagnetic member by means of a magnetizing device, a permanent magnet such as described above may be created.

C2. Modification Example 2

In the above embodiments, a drive voltage for direct current is applied to the electromagnetic coil. A pulse voltage may be applied to the electromagnetic coil as the drive voltage. In other words, the motor may be operated in a given direction, without changing the polarity of the drive voltage, by applying a voltage of a given polarity to the electromagnetic coil. In addition, from the perspective of the drive current, the motor will be operated in a given direction, without changing the direction of the drive current, by applying a drive current of a given direction to the electromagnetic coil. However, continuously applying a constant direct current voltage or a constant direct current instead of a pulse voltage or a pulse current has the advantage of simplifying the configuration of the drive control circuit.

C3. Modification Example 3

In the above embodiments, there are described concrete examples of the mechanical configuration and circuitry of the brushless motor. It is however possible to employ optional configurations other than the examples described above as mechanical configurations and circuitry for the brushless motor of the present invention.

C4. Modification Example 4

The present invention is applicable to motors for various apparatuses and devices. For example, the present invention is applicable to motors and devices of various kinds such as fan motors, clocks for driving the clock hands, drum type washing machines with single rotation, jet coasters, and vibrating motors. Where the present invention is implemented in a fan motor, the various advantages mentioned previously (low power consumption, low vibration, low noise, minimal rotation irregularities, low heat emission, and long life) will be particularly notable. Such fan motors may be employed, for example, as fan motors for digital display devices, vehicle on-board devices, fuel cell equipped apparatuses such as fuel cell equipped personal computers, fuel cell equipped digital cameras, fuel cell equipped video cameras and fuel cell equipped mobile phones, projectors, and various other devices. The motor of the present invention may also be utilized as a motor for various types of household electric appliances and electronic devices. For example, a motor in accordance with the present invention may be employed as a spindle motor in an optical storage device, magnetic storage device, and polygon mirror drive.

Figure 39:
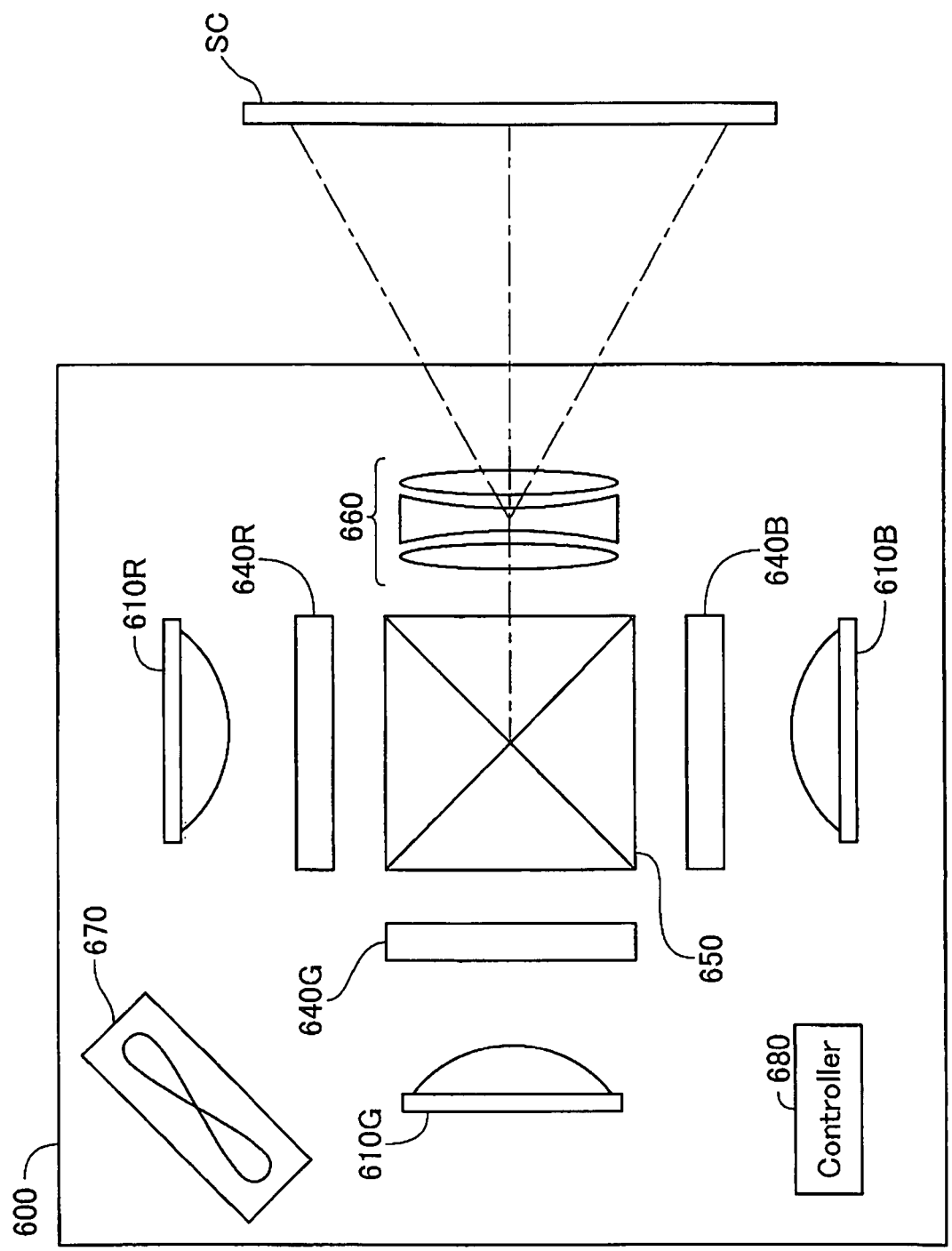
FIG. 39 is an explanatory drawing showing the projector that uses the motor in an example of the present invention.

FIG. 39 illustrates a projector utilizing a motor according to the present invention. The projector 600 includes three light sources 610R, 610G, 610B for emitting three colored lights of red, green and blue, three liquid crystal light valves 640R, 640G, 640B for modulating the three colored lights, a cross dichroic prism 650 for combining the modulated three colored lights, a projection lens system 660 for projecting the combined colored light toward a screen SC, a cooling fan 670 for cooling the interior of the projector, and a controller 680 for controlling the overall projector 600. Various rotation type brushless motors described above can be used as the motor for driving the cooling fan 670.

Figure 40A:
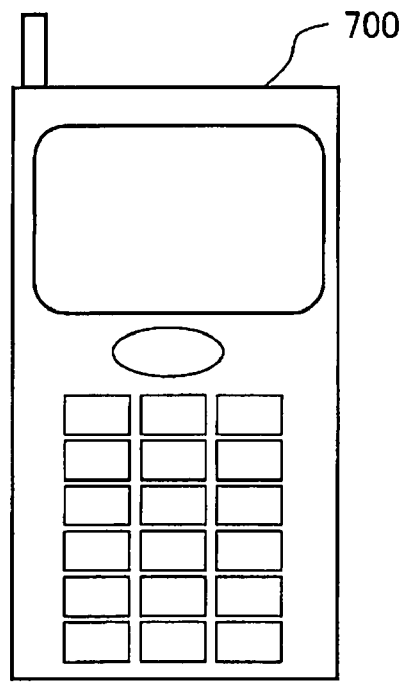
FIGS. 40A to 40C are explanatory drawings showing a fuel cell-type cellular telephone that uses the motor in an example of the present invention.
Figure 40B:
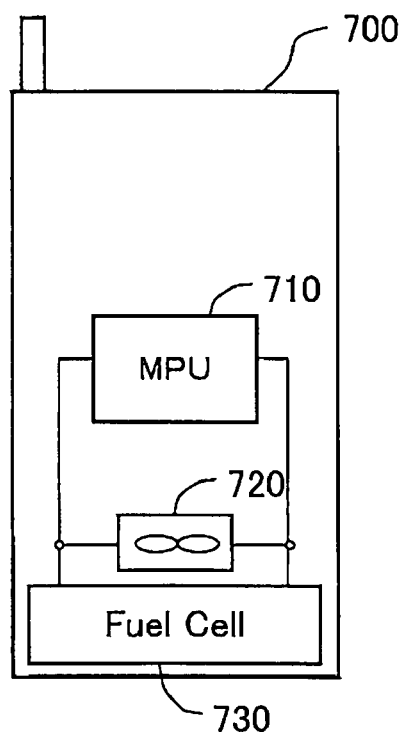
Figure 40C:
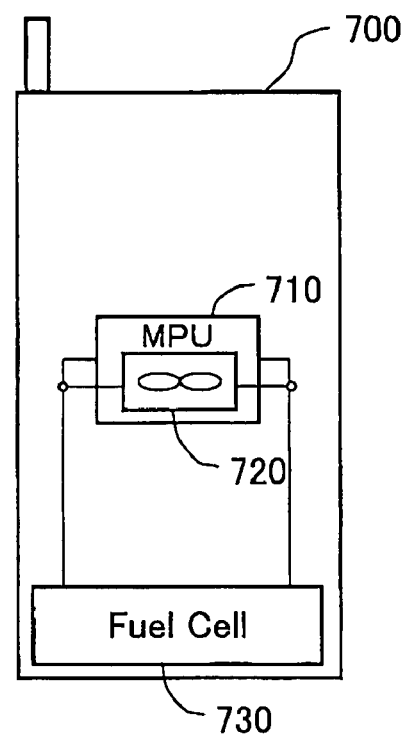

FIGS. 40A to 40C illustrate a mobile phone utilizing a motor according to the present invention. FIG. 40A shows the external view of a mobile phone 700, and FIG. 40B shows its exemplary internal configuration. The mobile phone 700 includes a MPU 710 for controlling the operation of the mobile phone 700, a fan 720, and a fuel cell 730. The fuel cell 730 supplies power to the MPU 710 and the fan 720. The fan 720 is installed in order to introduce air into the interior of the mobile phone 700 to supply the air to the fuel cell 730, or to exhaust the interior of the mobile phone 700 of water which will be produced by the fuel cell 730. The fan 720 may be installed over the MPU 710, as illustrated in FIG. 40C, to cool the MPU 710. Various rotation type brushless motors described above can be used as the motor for driving the fan 720.

Figure 41:
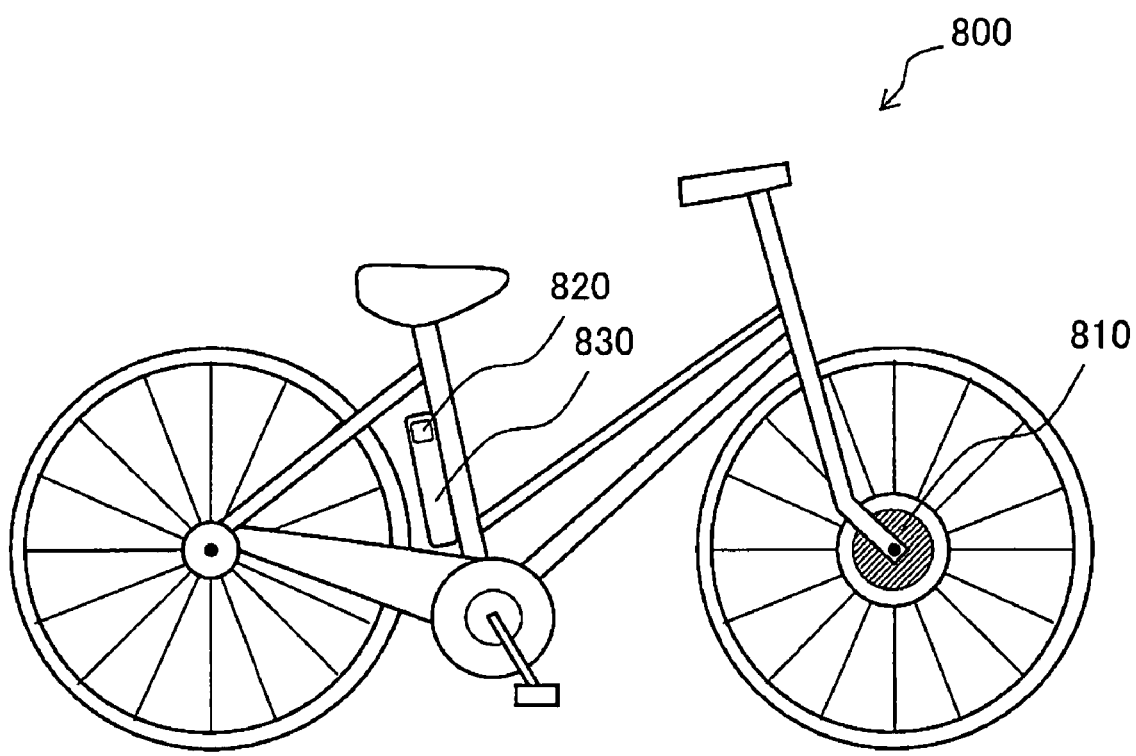
FIG. 41 is an explanatory drawing showing an electric-powered (electrically-assisted bicycle) as one example of the mobile equipment that uses a motor/generator in an example of the present invention.

FIG. 41 illustrates an electric bicycle (electric-assisted bicycle) as an example of a moving body utilizing a motor according to the present invention. The bicycle 800 includes a motor 810 at the front wheel, and a control circuit 820 and a rechargeable battery 830 both attached on the frame under the saddle. The motor 810 powered by the battery 830 drives the front wheel to assist the run. During braking, the regenerated power by the motor 810 is charged in the battery 830. The control circuit 820 controls the drive and regeneration of the motor 810. Various brushless motors described above can be used as the motor 810.

Figure 42:
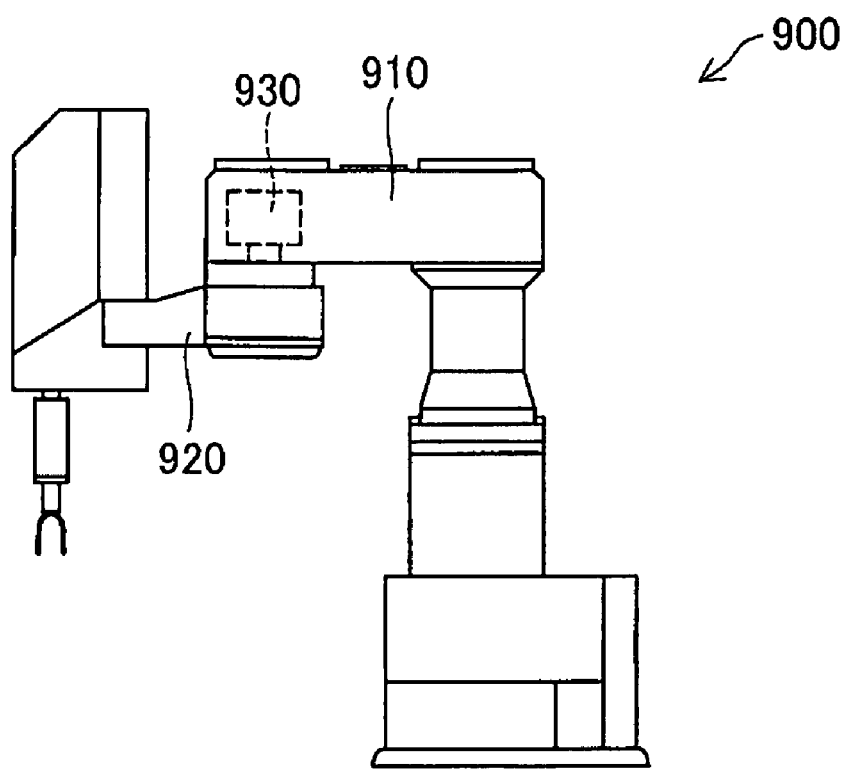
FIG. 42 is an explanatory drawing showing one example of the robots that use the motor in an example of the present invention.

FIG. 42 illustrates a robot utilizing a motor according to the present invention. The robot 900 includes a first arm 910, a second arm 920, and a motor 930. The motor 930 is used to horizontally rotate the second arm 920 as a driven member for the motor. Various brushless motors described above can be used as the motor 930.

What is claimed is:

1. A brushless motor operable in a given drive direction, comprising:
   a first member including one or more first permanent magnets magnetized in a direction perpendicular to the drive direction such that the one or more first permanent magnets have identical polarity;
   a second member opposing the first member and including an electromagnetic coil wound in a direction parallel to the drive direction;

a drive control circuit configured to supply electric power to the electromagnetic coil; and a driving force prevention member that prevents occurrence of driving force through electromagnetic interaction between a part of the electromagnetic coil and the first permanent magnet, wherein the drive control circuit supplies a drive current in a given first electric current direction to the electromagnetic coil without changing the electric current direction to operate the brushless motor in the drive direction;

the electromagnetic coil has a first coil portion facing the first permanent magnet, and a second coil portion farther from the first permanent magnet than the first coil portion, the driving force prevention member allows electromagnetic interaction between the first coil portion and the first permanent magnet while preventing electromagnetic interaction between the second coil portion and the first permanent magnet, the driving force prevention member is a second permanent magnet installed on an opposite side of the first permanent magnet with regard to the second drive element, the second permanent magnet is arranged so that same poles of the first and second permanent magnets are mutually opposing, the electromagnetic coil has as a core member a magnet assembly which includes a magnetic material member and two permanent magnets installed on both sides of the magnetic material member such that same poles of the two permanent magnets are respectively attracted by the magnetic material member, and the two permanent magnets of the magnet assembly are arranged opposite to the first and second permanent magnets respectively such that different poles are mutually opposing.

2. A moving body comprising the brushless motor according to claim 1.

3. An apparatus, comprising:

a brushless motor operable in a given drive direction;

a driven member driven by the brushless motor, wherein the brushless motor includes:

a first member including one or more first permanent magnets magnetized in a direction perpendicular to the drive direction such that the one or more first permanent magnets have identical polarity;

a second member opposing the first member and including an electromagnetic coil wound in a direction parallel to the drive direction; and a drive control circuit configured to supply electric power to the electromagnetic coil; and a driving force prevention member that prevents occurrence of driving force through electromagnetic interaction between a part of the electromagnetic coil and the first permanent magnet, wherein the drive control circuit supplies a drive current in a given first electric current direction to the electromagnetic coil without changing the electric current direction to operate the brushless motor in the drive direction, the electromagnetic coil has a first coil portion facing the first permanent magnet, and a second coil portion farther from the first permanent magnet than the first coil portion, the driving force prevention member allows electromagnetic interaction between the first coil portion and the first permanent magnet while preventing electromagnetic interaction between the second coil portion and the first permanent magnet, the driving force prevention member is a second permanent magnet installed on an opposite side of the first permanent magnet with regard to the second drive element, the second permanent magnet is arranged so that same poles of the first and second permanent magnets are mutually opposing, the electromagnetic coil has as a core member a magnet assembly which includes a magnetic material member and two permanent magnets installed on both sides of the magnetic material member such that same poles of the two permanent magnets are respectively attracted by the magnetic material member, and the two permanent magnets of the magnet assembly are arranged opposite to the first and second permanent magnets respectively such that different poles are mutually opposing.

* * * * *